United States Patent
Ariyoshi et al.

(10) Patent No.: US 11,731,607 B2
(45) Date of Patent: Aug. 22, 2023

(54) CONTROL METHOD FOR HYBRID VEHICLE AND CONTROL APPARATUS FOR HYBRID VEHICLE

(71) Applicant: Nissan Motor Co., Ltd., Kanagawa (JP)

(72) Inventors: Tomohiro Ariyoshi, Kanagawa (JP); Satomi Eto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 327 days.

(21) Appl. No.: 16/772,950

(22) PCT Filed: Dec. 15, 2017

(86) PCT No.: PCT/JP2017/045216
§ 371 (c)(1),
(2) Date: Jun. 15, 2020

(87) PCT Pub. No.: WO2019/116582
PCT Pub. Date: Jun. 20, 2019

(65) Prior Publication Data
US 2021/0162979 A1 Jun. 3, 2021

(51) Int. Cl.
*B60W 20/00* (2016.01)
*B60W 20/13* (2016.01)
(Continued)

(52) U.S. Cl.
CPC ............ *B60W 20/13* (2016.01); *B60W 10/06* (2013.01); *B60W 10/08* (2013.01); *B60W 40/08* (2013.01);
(Continued)

(58) Field of Classification Search
CPC ...... B60W 20/13; B60W 20/14; B60W 10/06; B60W 10/08; B60W 40/08; B60W 40/105;
(Continued)

(56) References Cited

U.S. PATENT DOCUMENTS 9,796,375 B2 * 10/2017 Oshiumi ................ B60L 50/15
10,011,270 B2 * 7/2018 Fukuchi .................. B60K 6/52
(Continued)

FOREIGN PATENT DOCUMENTS

| JP | 2007118780 A | 5/2007 |
| JP | 2008049868 A | 3/2008 |

(Continued)

OTHER PUBLICATIONS

International Search Report issued in International Application No. PCT/JP2017/045216, dated Mar. 3, 2018 (6 pages).
(Continued)

*Primary Examiner* — Jacob M Amick
*Assistant Examiner* — Sherman D Manley
(74) *Attorney, Agent, or Firm* — Osha Bergman Watanabe & Burton LLP

(57) ABSTRACT

A control method for a hybrid vehicle is provided. The hybrid vehicle includes an electric motor (13) that drives the vehicle to travel, a generator (12) that supplies power to the electric motor (13), and an engine (11) that drives the generator (12). The control method includes: when bringing the electric motor (13) into a regenerative state, operating the generator to drive the engine (11) in a state in which fuel supply to the engine (11) is cut, thereby executing, in accordance with required deceleration, the motoring control for consuming the output power of the electric motor (13); and when increasing the rotational speed of the engine (11) due to an increase in the required deceleration upon execu- (Continued)

tion of the motoring control, setting the rotational speed of the engine (11) such that the change rate of the rotational speed of the engine (11) increases as the consumed power by the motoring control increases.

7 Claims, 18 Drawing Sheets

(51) Int. Cl.
 B60W 10/06 (2006.01)
 B60W 10/08 (2006.01)
 B60W 40/08 (2012.01)
(52) U.S. Cl.
 CPC . B60W 2510/0652 (2013.01); B60W 2540/10 (2013.01)
(58) Field of Classification Search
 CPC ..... B60W 2510/0652; B60W 2540/10; B60W 30/18127; B60W 2520/10; B60W 2710/0644; B60K 6/46; B60Y 2200/92; Y02T 10/62
 See application file for complete search history.

(56) References Cited

U.S. PATENT DOCUMENTS

| 10,020,770 | B2* | 7/2018 | Kitaori | H02P 21/22 |
| 10,392,005 | B2* | 8/2019 | Hatsuda | B60W 20/40 |
| 11,312,358 | B2* | 4/2022 | Yui | B60W 10/08 |
| 11,345,347 | B2* | 5/2022 | Murase | B60W 10/188 |
| 2002/0179348 | A1* | 12/2002 | Tamai | B60K 6/485 |
| | | | | 180/65.25 |
| 2003/0160455 | A1* | 8/2003 | Hu | B60W 10/06 |
| | | | | 290/40 C |
| 2005/0082097 | A1* | 4/2005 | Ichimoto | B60W 10/08 |
| | | | | 903/910 |
| 2005/0189894 | A1* | 9/2005 | Komiyama | B60W 10/08 |
| | | | | 318/139 |
| 2007/0118255 | A1* | 5/2007 | Wakashiro | B60K 6/543 |
| | | | | 701/22 |
| 2011/0174559 | A1* | 7/2011 | Saito | B60W 30/19 |
| | | | | 903/902 |
| 2012/0130577 | A1* | 5/2012 | Ichimoto | B60W 20/13 |
| | | | | 903/930 |
| 2012/0309587 | A1* | 12/2012 | Nozaki | B60W 10/02 |
| | | | | 180/65.265 |
| 2013/0173107 | A1* | 7/2013 | Kokon | B60W 10/18 |
| | | | | 903/930 |
| 2015/0224981 | A1* | 8/2015 | Fujishiro | B60W 20/13 |
| | | | | 180/65.265 |
| 2016/0059843 | A1* | 3/2016 | Oguma | B60W 10/06 |
| | | | | 180/65.265 |
| 2017/0066434 | A1 | 3/2017 | Kato | |

FOREIGN PATENT DOCUMENTS

| JP | 2010-023731 A | 2/2010 |
| JP | 2016049837 A | 4/2016 |
| JP | 2016049838 A | 4/2016 |
| JP | 2017047821 A | 3/2017 |

OTHER PUBLICATIONS

International Preliminary Report on Patentability issued in International Application No. PCT/JP2017/045216; dated Jun. 4, 2019 (13 pages).

* cited by examiner

CONTROL METHOD FOR HYBRID VEHICLE AND CONTROL APPARATUS FOR HYBRID VEHICLE

TECHNICAL FIELD

The present invention relates to a control method and a control apparatus for a hybrid vehicle.

BACKGROUND ART

A regenerative control apparatus for a hybrid vehicle is known (Patent Document 1). The hybrid vehicle has an engine, a first motor for controlling the rotational speed of the engine, a second motor that regenerates inertial energy of the vehicle to generate power, and an electricity storage device that exchanges power with the first motor and the second motor. The regenerative control apparatus includes a determination means and a charging restriction means. The determination means determines a regenerative state. In the regenerative state, during regenerative braking in which the second motor is driven by the inertial energy of the vehicle to generate the power, the power received by the electricity storage device is restricted so that part of the power generated by the second motor is supplied to the first motor, which forcibly rotates the engine. When a determination of the regenerative state is established, the charging restriction means reduces an amount of relaxing the restriction on the power received by the electricity storage device as compared with that when the determination of the regenerative state is not established.

PRIOR ART DOCUMENT

Patent Document

[Patent Document 1] JP2010-23731A

SUMMARY OF INVENTION

Problems to be Solved by Invention

According to the above prior art, when the energy regeneration is performed, as the vehicle speed increases, the amount of relaxing the restriction on the power received by the electricity storage device is reduced to suppress the variation in the supplied power to the first motor which controls the rotational speed of the engine, and the increase in the rotational speed of the engine is thus suppressed. However, during deceleration by releasing the accelerator pedal, for example, the required deceleration increases, and, if the increase in the rotational speed of the engine is suppressed when the regenerative power is ensured by driving the engine with the generator, the power cannot be consumed sufficiently and a satisfactory deceleration feel cannot be obtained for the driver's intention to decelerate, which may give an uncomfortable feeling to the driver.

A problem to be solved by the present invention is to provide a control method and a control apparatus for a hybrid vehicle that are able to alleviate the uncomfortable feeling given to the driver.

Means for Solving Problems

The present invention solves the above problem by, when increasing the engine rotational speed due to an increase in the required deceleration upon execution of the motoring control, setting the engine rotational speed such that a change rate of the engine rotational speed increases as the consumed power by the motoring control increases.

In general, operating a generator to drive an engine with no load in a state in which fuel supply to the engine is cut is referred to as motoring, but in the present invention, as will be described later, also in a vehicle state in which the input power to a battery is restricted, operating a generator to drive an engine with no load using the battery power in order to ensure the regenerative amount by an electric motor is referred to as motoring.

Effect of Invention

According to the present invention, the uncomfortable feeling given to the driver can be alleviated.

MODE(S) FOR CARRYING OUT THE INVENTION

«Mechanical Configuration of Hybrid Vehicle»

Figure 1:
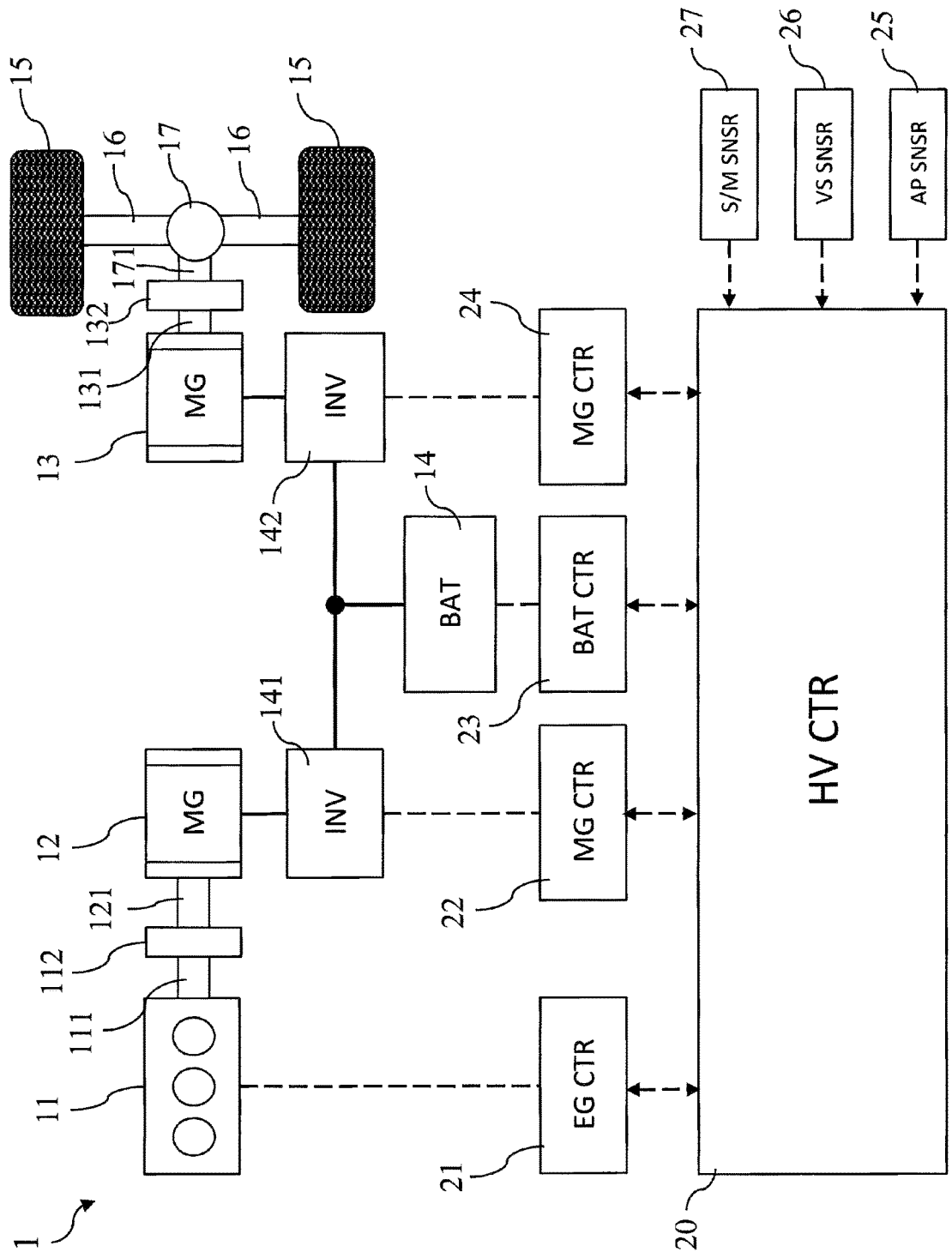
FIG. 1 is a block diagram illustrating an embodiment of a hybrid vehicle to which the control method for a hybrid vehicle according to the present invention is applied.

FIG. 1 is a block diagram illustrating an embodiment of a hybrid vehicle to which the control method for a hybrid vehicle according to the present invention is applied. Hybrid vehicle 1 of the present embodiment includes an engine 11, a generator 12, an electric motor 13, a battery 14, drive wheels 15 and 15, drive axles 16 and 16, and a differential gear 17. The hybrid vehicle 1 of the present embodiment is a vehicle in which the drive wheels 15 and 15 are driven only by the driving force of the electric motor 13 rather than by the driving force of the engine 11. This type of hybrid vehicle 1 is called a series hybrid vehicle in contrast to a parallel hybrid vehicle and a power-split hybrid vehicle because the engine 11, the electric motor 13, and the drive wheels 15 and 15 are connected in series (series connection).

The engine 11 of the present embodiment is controlled to start and stop with an engine torque command value that is input from an engine controller 21, which will be described later. The cranking at the time of starting is performed by the driving force from the generator 12 which is configured as a motor generator. Then, fuel injection control, air-intake amount control, ignition control, and other control of drive parameters of the engine 11 are executed in accordance with the engine torque command value, and the engine 11 is driven at a rotational speed determined in accordance with the engine torque command value. The engine 11 has an output shaft 111, which is mechanically connected to a rotating shaft 121 of the generator 12 via a speed-up gear 112. Thus, when the engine 11 is driven, the rotating shaft 121 of the generator 12 rotates in accordance with the speed increase ratio of the speed-up gear 112 (which may be a constant speed increase ratio or a variable speed increase ratio). As a result, the generator 12 generates electric power of a power generation amount corresponding to the rotational speed of the rotating shaft 121.

The engine 11 also serves as a load when discharging the electric power during regeneration by the electric motor 13, which will be described later. For example, when it is desired to achieve motor brake by the electric motor 13 in accordance with the state of charge (SOC) of the battery 14, the electric power regenerated by the electric motor 13 is supplied to the generator 12 which serves as a motor generator, and the surplus power can be discharged such that the generator 12 operates the engine 11 with no load in which the fuel injection is stopped.

The generator 12 of the present embodiment serves not only as a generator but also as a motor (electric motor) through the switching control performed by a first inverter 141. The generator 12 serves as a motor when performing the above-described cranking operation at the time of start of the engine 11 or process of discharging the power from the electric motor 13. It suffices, however, that the generator 12 serves at least as a motor in order to realize the control method and apparatus for controlling a hybrid vehicle according to the present invention.

The generator 12 of the present embodiment is electrically connected to the battery 14 via the first inverter 141 so that electric power can be transmitted and received. In addition, the generator 12 of the present embodiment is electrically connected to the electric motor 13 via the first inverter 141 and a second inverter 142 so that electric power can be transmitted and received. The first inverter 141 converts AC power generated by the generator 12 into DC power and supplies the DC power to the battery 14 and/or the second inverter 142. The first inverter 141 also converts DC power supplied from the battery 14 and/or the second inverter 142 into AC power and supplies the AC power to the generator 12. The first inverter 141 and the generator 12 are controlled by a rotational speed command value from a generator controller 22, which will be described later.

The battery 14 of the present embodiment, which is composed of a secondary battery such as a lithium ion battery, receives and stores the electric power generated by the generator 12 via the first inverter 141 and also receives and stores the electric power regenerated by the electric motor 13 via the second inverter 142. Although illustration is omitted, the battery 14 may also be configured to be charged from an external commercial power supply. The battery 14 of the present embodiment supplies the stored electric power to the electric motor 13 via the second inverter 142 to drive the electric motor 13. The battery 14 of the present embodiment also supplies the stored electric power to the generator 12, which serves as a motor, via the first inverter 141 to drive the generator 12 and executes the cranking of the engine 11, the operation of the engine with no load, etc. The battery 14 is monitored by a battery controller 23, which executes charge/discharge control in accordance with the state of charge SOC. With regard to the power supply source to the electric motor 13 of the present embodiment, the battery 14 may be used as a main power source while the generator 12 may be used as a sub power source, or the generator 12 may be used as a main power source while the battery 14 may be used as a sub power source. To realize the control method and apparatus for controlling a hybrid vehicle according to the present invention, the battery 14 as illustrated in FIG. 1 is not necessarily required, and the battery 14 may be omitted as necessary, provided that a battery for cranking the engine 11 is provided and the rated generated power of the generator 12 is sufficiently large for the hybrid vehicle 1 to travel. A travel mode can be set when a shift lever switch is set to a drive position or a brake position.

The electric motor 13 of the present embodiment has a rotating shaft 131, which is connected to a gear input shaft 171 of the differential gear 17 via a speed-down gear 132. The rotation torque of the rotating shaft 131 of the electric motor 13 is transmitted to the speed-down gear 132 and the differential gear 17. The differential gear 17 divides the rotation torque into right and left components, which are respectively transmitted to the right and left drive wheels 15 and 15 via the right and left drive axles 16 and 16. This allows the drive wheels 15 and 15 to rotate in accordance with the drive torque of the electric motor 13, and the hybrid vehicle 1 moves forward or backward. The speed reduction ratio of the speed-down gear 132 may be a fixed reduction ratio or may also be a variable reduction ratio. For example, a transmission may be provided as substitute for the speed-down gear 132.

A shift lever switch sensor/travel mode switch sensor 27 is provided (which will be also referred to as an S/M sensor 27, hereinafter). The S/M sensor 27 includes a shift lever switch sensor, which detects a shift lever switch. The shift lever switch is a lever-type switch that can select any one of a neutral position, a parking position, a drive position, a reverse position, and a brake position. The shift lever switch is generally installed on the center console or the like next to the driver seat. When the drive position is selected, the electric motor 13 rotates in the direction corresponding to the forward direction of the vehicle, and when the reverse position is selected, the electric motor 13 rotates reversely in the direction corresponding to the backward direction of the vehicle. The brake position refers to a position at which the target regenerative driving force of the electric motor 13 with respect to the traveling speed is set larger, and when the accelerator pedal is released, the electric motor 13 achieves the motor brake which is large enough to stop the hybrid vehicle 1 without a brake operation. The S/M sensor 27 further includes a travel mode switch sensor, which detects a travel mode switch. The travel mode switch refers, for example, to a button-type or dial-type switch for switching among a plurality of travel modes, such as a normal travel mode, an eco-travel mode, and a sports travel mode, in which profiles of the target driving force with respect to the vehicle speed and the accelerator pedal position are different (the travel modes will be described later with reference to FIG. 3). The travel mode switch is generally installed on the center console or the like next to the driver seat.

The electric motor 13 of the present embodiment serves not only as a motor but also as a generator (electric generator) through the switching control performed by the second inverter 142. The electric motor 13 serves as a generator when charging the above-described battery 14 in the case of a low state of charge SOC or when it is desired to achieve the regenerative brake during deceleration. It suffices, however, that the electric motor 13 serves at least as an electric motor in order to realize the control method and apparatus for controlling a hybrid vehicle according to the present invention.

The electric motor 13 of the present embodiment is electrically connected to the battery 14 via the second inverter 142 so that electric power can be transmitted and received. In addition, the electric motor 13 of the present embodiment is electrically connected to the generator 12 via the first inverter 141 and the second inverter 142 so that electric power can be transmitted and received. The second inverter 142 converts DC power supplied from the battery 14 and/or the first inverter 141 into AC power and supplies the AC power to the electric motor 13. The second inverter 142 also converts AC power generated by the electric motor 13 into DC power and supplies the DC power to the battery 14 and/or the first inverter 141. The second inverter 142 and the electric motor 13 are controlled by a drive torque command value from an electric motorcontroller 24, which will be described later.

As described above, in the hybrid vehicle 1 of the present embodiment, when the driver depresses the accelerator pedal after turning on the power switch and releasing the side brake, the required drive torque corresponding to the depression amount of the accelerator pedal is calculated by a vehicle controller 20. The drive torque command value is output to the second inverter 142 and the electric motor 13 via the electric motor controller 24, and the electric motor 13 is driven to generate the torque corresponding to the drive torque command value. This allows the drive wheels 15 and 15 to rotate, and the hybrid vehicle 1 travels. In this operation, a determination is made as to whether or not to drive the engine 11, on the basis of the input values from an accelerator sensor 25, a vehicle speed sensor 26, and the S/M sensor 27 and the state of charge SOC of the battery 14 monitored by the battery controller 23, and when the necessary conditions are satisfied, the hybrid vehicle 1 travels while driving the engine 11.

While the hybrid vehicle 1 is traveling, when the driver releases the accelerator pedal, for example, the vehicle controller 20 calculates the required driving torque (required regenerative torque) corresponding the accelerator pedal position or the like. In this operation, for the regenerative power generated by the electric motor 13, a determination is made as to whether or not to operate the generator 12 to drive the engine 11 in accordance with the power that can be input to the battery 14 (referred to as acceptable battery input power, hereinafter), on the basis of the input values from the accelerator sensor 25, vehicle speed sensor 26, and S/M sensor 27 and the state of charge SOC of the battery 14 monitored by the battery controller 23. When the regenerative power of the electric motor 13 is not larger than the acceptable battery input power, for suppression of the input power to the battery, the generator 12 may not be driven. On the other hand, when the target regenerative power of the electric motor 13 is larger than the acceptable battery input power, the generator 12 is operated to drive the engine 11 so that the electric power which cannot be supplied to the battery 14 is consumed by driving the engine 11. In this operation, no fuel is supplied to the engine 11. Thus, when bringing the electric motor 13 into the regenerative state, the vehicle controller 20 operates the generator 12 to drive the engine 11 in a state in which the fuel supply to the engine 11 is cut, thereby executing, in accordance with the required regenerative torque, the control for ensuring the regenerative amount by the electric motor 13. The configuration of a control system will be described below, including the drive control for the engine 11. The following configuration of the control system is a configuration for executing the regenerative control.

«Configuration of Control System for Hybrid Vehicle»

Figure 2:
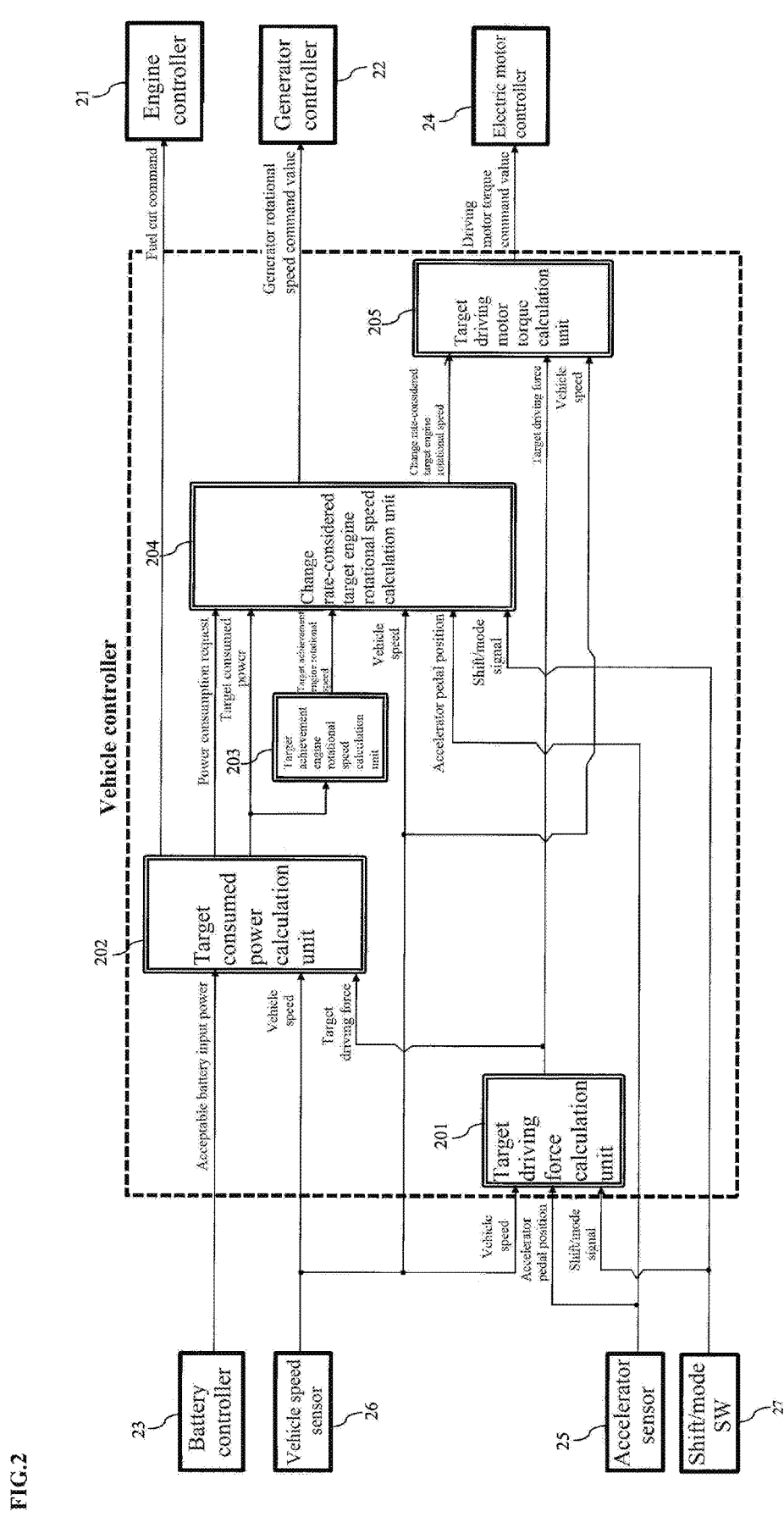
FIG. 2 is a control block diagram illustrating the main configuration of a control system for the hybrid vehicle of FIG. 1.

FIG. 2 is a control block diagram illustrating a main configuration of the control system for the hybrid vehicle 1 of the present embodiment illustrated in FIG. 1. As illustrated in FIG. 2, the control system of the present embodiment includes the battery controller 23, accelerator sensor 25, vehicle speed sensor 26, and S/M sensor 27 as input elements and the engine controller 21, generator controller 22, and electric motor controller 24 as output target elements. Respective signals from the input elements are processed by the vehicle controller 20 and output as control signals to the output target elements.

The battery controller 23 as an input element calculates the current acceptable battery input power (W) from the current state of charge SOC (e.g., 0% to 100%) and the rated output power of the battery 14 to be monitored and outputs the calculated current acceptable battery input power (W) to a target consumed power calculation unit 202. The accelerator sensor 25 as an input element detects a depression amount of the accelerator pedal which the driver depresses and releases, and outputs the detected depression amount as an accelerator pedal position (e.g., 0% to 100%) to a target driving force calculation unit 201. The vehicle speed sensor 26 as an input element calculates the vehicle speed from the rotational speed of the rotating shaft 131 of the electric motor 13, the speed reduction ratio of the speed-down gear 132, and the radius of the drive wheels 15, for example, and outputs the calculated vehicle speed to the target driving force calculation unit 201, the target consumed power calculation unit 202, and a change rate-considered target engine rotational speed calculation unit 204. The S/M sensor 27 as an input element outputs a shift signal and a mode signal to the target driving force calculation unit 201 and the change rate-considered target engine rotational speed calculation unit 204. The shift signal is selected by the above-described shift lever switch (any one of the neutral position, parking position, drive position, reverse position, and brake position). The mode signal is selected by the above-described travel mode switch (any one of the normal travel mode, eco-travel mode, and sports travel mode).

A fuel cut command that is output from the target consumed power calculation unit 202 is input to the engine controller 21 as an output target element. On the basis of the fuel cut command, the engine controller 21 controls the fuel supply to the engine 11. A generator rotational speed command value that is calculated by the change rate-considered target engine rotational speed calculation unit 204 is input to the generator controller 22 as an output element. On the basis of the generator rotational speed command value, the generator controller 22 controls the electric power supplied to the generator 12. A target driving motor torque calculation unit 205 is provided, which calculates a driving motor torque command value. The driving motor torque command value is input to the electric motor controller 24 as an output element, which controls the regenerative power of the electric motor 13. The driving motor torque command value is a main command value for controlling the hybrid vehicle 1 to travel in accordance with the driver's accelerator operation. In the following description, accelerator operations include not only manual driving performed by the driver but also an acceleration operation based on an accelerator command value that is calculated using a so-called automated (autonomous) driving function in a hybrid vehicle having such an automated (autonomous) driving function.

The configuration of the vehicle controller 20 will then be described. The vehicle controller 20 processes respective signals from the above-described input elements and outputs control signals to the output target elements. The vehicle controller 20 of the present embodiment includes the target driving force calculation unit 201, the target consumed power calculation unit 202, a target achievement engine rotational speed calculation unit 203, the change rate-considered target engine rotational speed calculation unit 204, and the target driving motor torque calculation unit 205.

The vehicle controller 20 is configured as a computer installed with hardware and software. More specifically, the vehicle controller 20 is configured to include a read only memory (ROM) that stores programs, a central processing unit (CPU) that executes the programs stored in the ROM, and a random access memory (RAM) that serves as an accessible storage device, A micro processing unit (MPU), a digital signal processor (DSP), an application specific integrated circuit (ASIC), a field programmable gate array (FPGA), or the like can be used as an operation circuit as substitute for or in addition to the CPU. The above-described target driving force calculation unit 201, target consumed power calculation unit 202, target achievement engine rotational speed calculation unit 203, change rate-considered target engine rotational speed calculation unit 204, and target driving motor torque calculation unit 205 achieve respective functions, which will be described below, by the software established in the ROM. Likewise, the engine controller 21, generator controller 22, and electric motor controller 24 as the output target elements and the battery controller 23 as the input element are each configured as a computer installed with hardware and software, that is, configured to include a ROM that stores programs, a CPU (or MPU, DSP, ASIC, or FPGA) that executes the programs stored in the ROM, and a RAM that serves as an accessible storage device.

Figure 3:
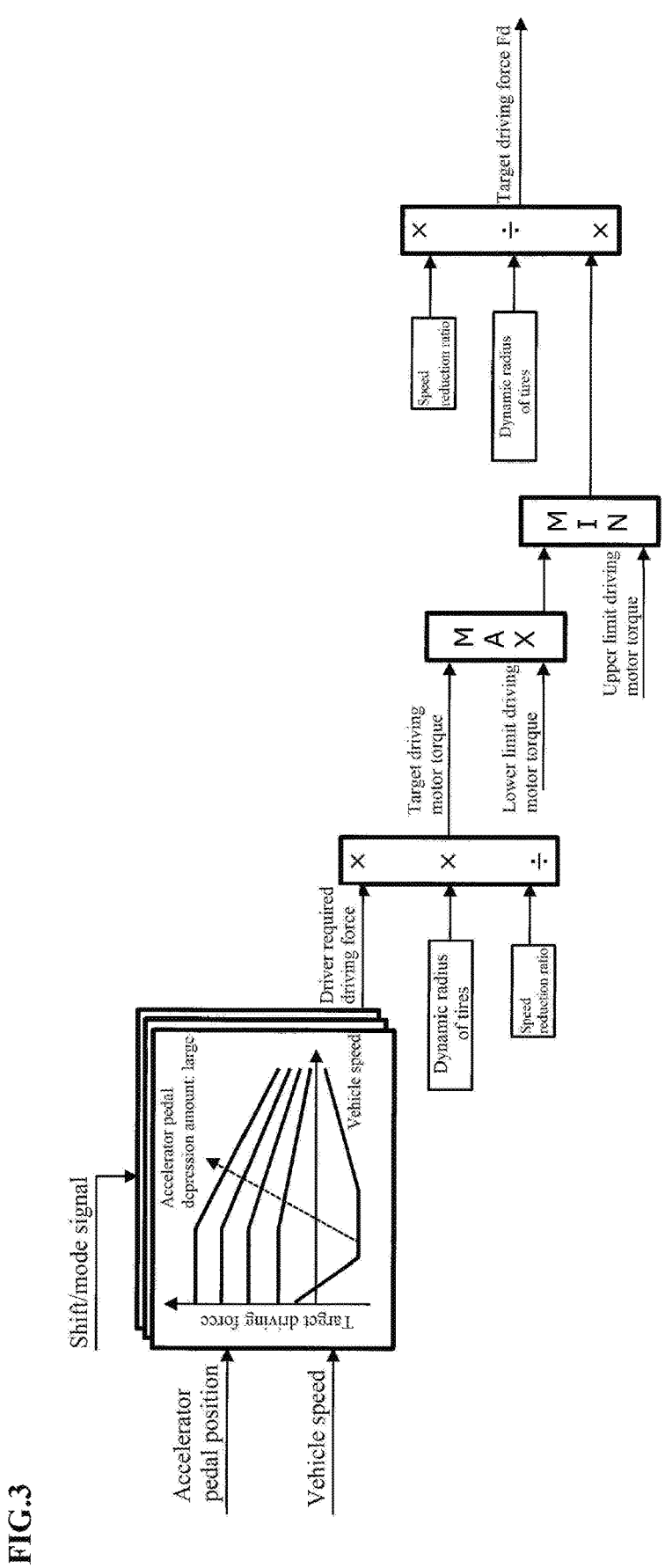
FIG. 3 is a control block diagram illustrating the main configuration of a target driving force calculation unit of FIG. 2.

FIG. 3 is a control block diagram illustrating a main configuration of the target driving force calculation unit 201 of FIG. 2. The accelerator pedal position from the accelerator sensor 25, the vehicle speed from the vehicle speed sensor 26, and respective signals of the shift position and travel mode from the S/M sensor 27 are input to the target driving force calculation unit 201, which outputs target driving force Fd and the driving motor torque command value. The vehicle controller includes a memory, which stores respective control maps in the three travel modes, that is, the sports travel mode, the normal travel mode, and the eco-travel mode, for each of the shift positions (drive position and brake position). The maps include three control maps in the three travel modes of the sports travel mode, normal travel mode, and eco-travel mode. Likewise, the control maps in the three travel modes of the sports travel mode, normal travel mode, and eco-travel mode when the brake position is selected are also stored. The three travel modes corresponding to each shift position are different in the magnitude of the target driving force (vertical axis) with respect to the vehicle speed (horizontal axis) and the accelerator pedal depression amount (multiple lines). In the sports travel mode, the target driving force with respect to the vehicle speed and the accelerator pedal depression amount is set relatively large, while in the eco-travel mode, the target driving force with respect to the vehicle speed and the accelerator pedal depression amount is set relatively small, and a medium value is set in the normal travel mode. The travel modes for each shift position correspond to the travel specifications of the present invention.

Respective signals of the shift position and travel mode from the S/M sensor 27 are input to the target driving force calculation unit 201, which extracts the control map in the travel mode corresponding to the shift position and extracts the corresponding target driving force in accordance with the accelerator pedal position from the accelerator sensor 25 and the vehicle speed from the vehicle speed sensor 26. The target driving force is converted in the unit into the target driving motor torque using the dynamic radius of the driving wheels 15 and the speed reduction ratio of the speed-down gear 132. Here, if the obtained target driving motor torque exceeds an upper limit torque value that is preliminarily set, the upper limit torque value is set as the target driving motor torque, while if the obtained target driving motor torque is less than a lower limit torque value that is preliminarily set, the lower limit torque value is set as the target driving motor torque value. Then, the target driving motor torque thus obtained is output as a driving motor torque command value to the electric motor 13. In addition, the target driving motor torque thus obtained is reconverted in the unit into the target driving force Fd using the dynamic radius of the drive wheels 15 and the speed reduction ratio of the speed-down gear 132, and the target driving force Fd is output to the target consumed power calculation unit 202 and the target driving motor torque calculation unit 205.

Figure 4:
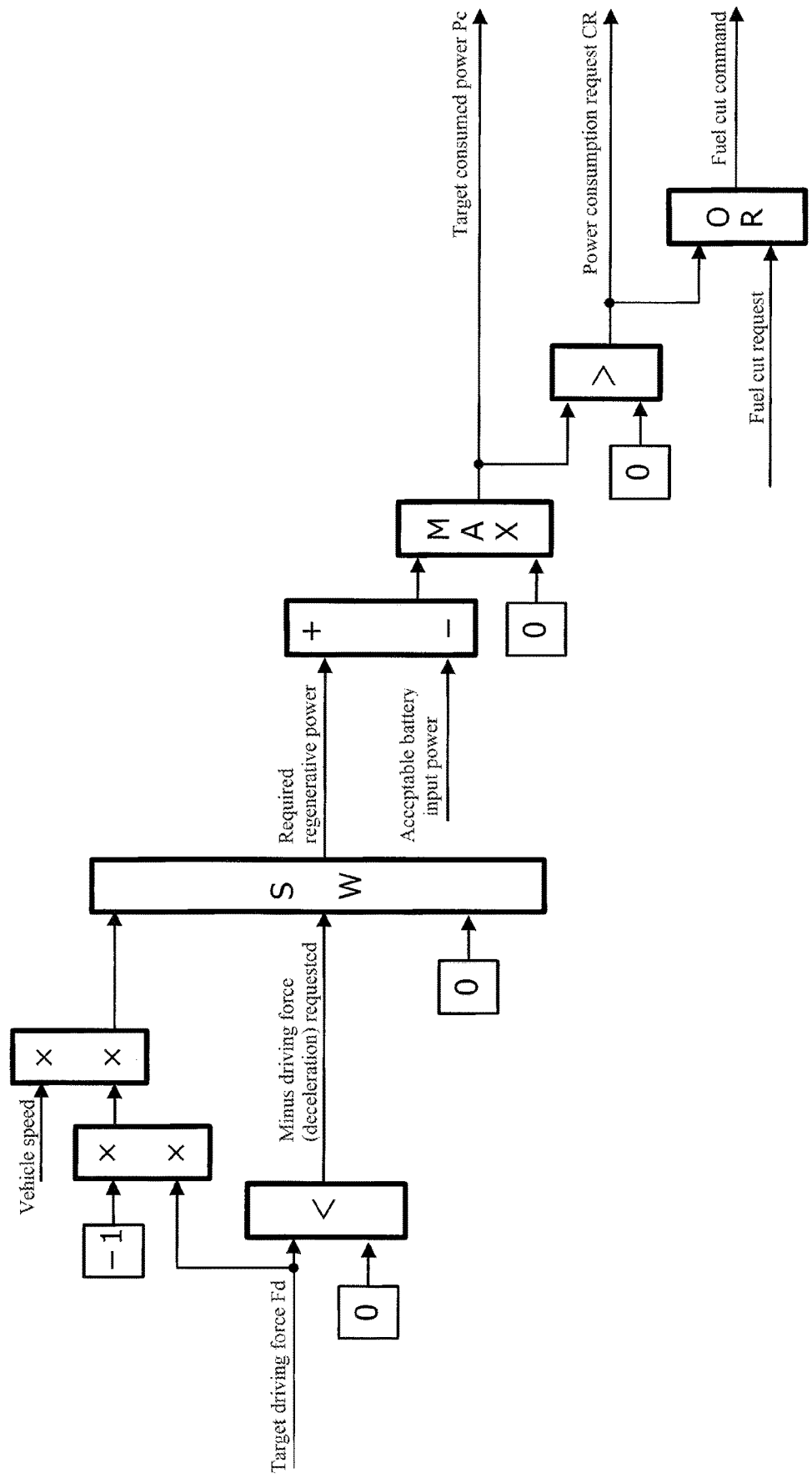
FIG. 4 is a control block diagram illustrating the main configuration of a target consumed power calculation unit of FIG. 2.

FIG. 4 is a control block diagram illustrating a main configuration of the target consumed power calculation unit 202 of FIG. 2. The target driving force Fd from the target driving force calculation unit 201 is input to the target consumed power calculation unit 202, which compares the target driving force with a predetermined value (0) to determine whether or not the target driving force Fd is negative or minus driving force. When the target driving force Fd is the regenerative driving force, the target driving force Fd is multiplied by the vehicle speed to calculate the required regenerative power. The required regenerative power is regenerative power that is required for the vehicle. The target consumed power calculation unit 202 subtracts the acceptable battery input power from the required regenerative power. The acceptable battery input power is determined in accordance with the SOC. The target consumed power calculation unit 202 compares the value obtained by subtracting the acceptable battery input power from the required regenerative power with a predetermined value (0) and outputs the higher value as target consumed power Pc. That is, the power obtained by subtracting the acceptable battery input power from the required regenerative power corresponds to the target consumed power which is consumed by driving the engine 11. When the value obtained by the subtraction is larger than 0, the target consumed power calculation unit 202 outputs a power consumption request CR. When a request for fuel cut is input due to a system request or the like or when the power consumption request is input, the target consumed power calculation unit 202 outputs a fuel cut command.

Figure 5:
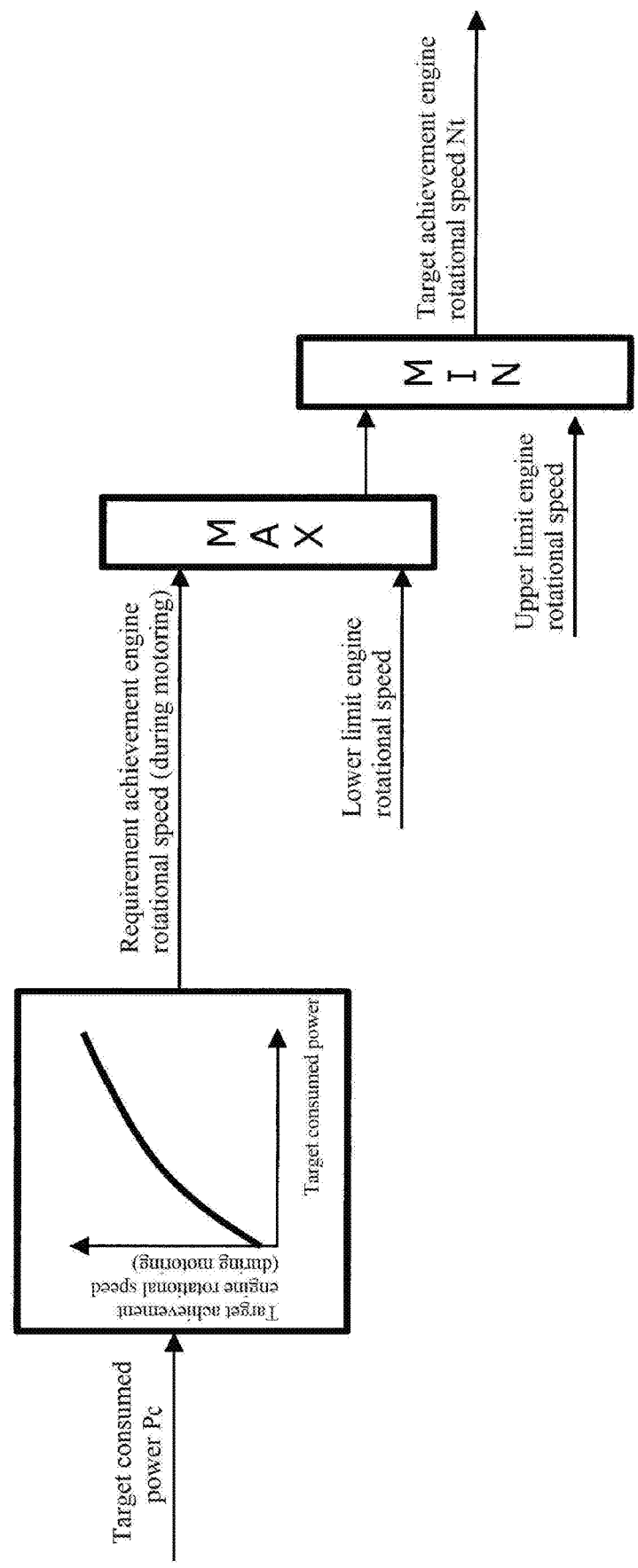
FIG. 5 is a control block diagram illustrating the main configuration of a target achievement engine rotational speed calculation unit of FIG. 2.

FIG. 5 is a control block diagram illustrating a main configuration of the target achievement engine rotational speed calculation unit 203 of FIG. 2. The vehicle controller 20 includes a memory, which stores a control map for a requirement achievement engine rotational speed with respect to the target consumed power, as illustrated in FIG. 5. The target consumed power Pc is input to the target achievement engine rotational speed calculation unit 203, which refers to the control map illustrated in FIG. 5 to extract the requirement achievement engine rotational speed. When the requirement achievement engine rotational speed is lower than a lower limit engine rotational speed that is preliminarily set, the target achievement engine rotational speed calculation unit 203 sets the lower limit engine rotational speed as the target achievement engine rotational speed, while when the requirement achievement engine rotational speed is higher than an upper limit engine rotational speed that is preliminarily set, the target achievement engine rotational speed calculation unit 203 sets the upper limit engine rotational speed as the target achievement engine rotational speed. Then, the target achievement engine rotational speed calculation unit 203 outputs target achievement engine rotational speed Nt.

Figure 6:
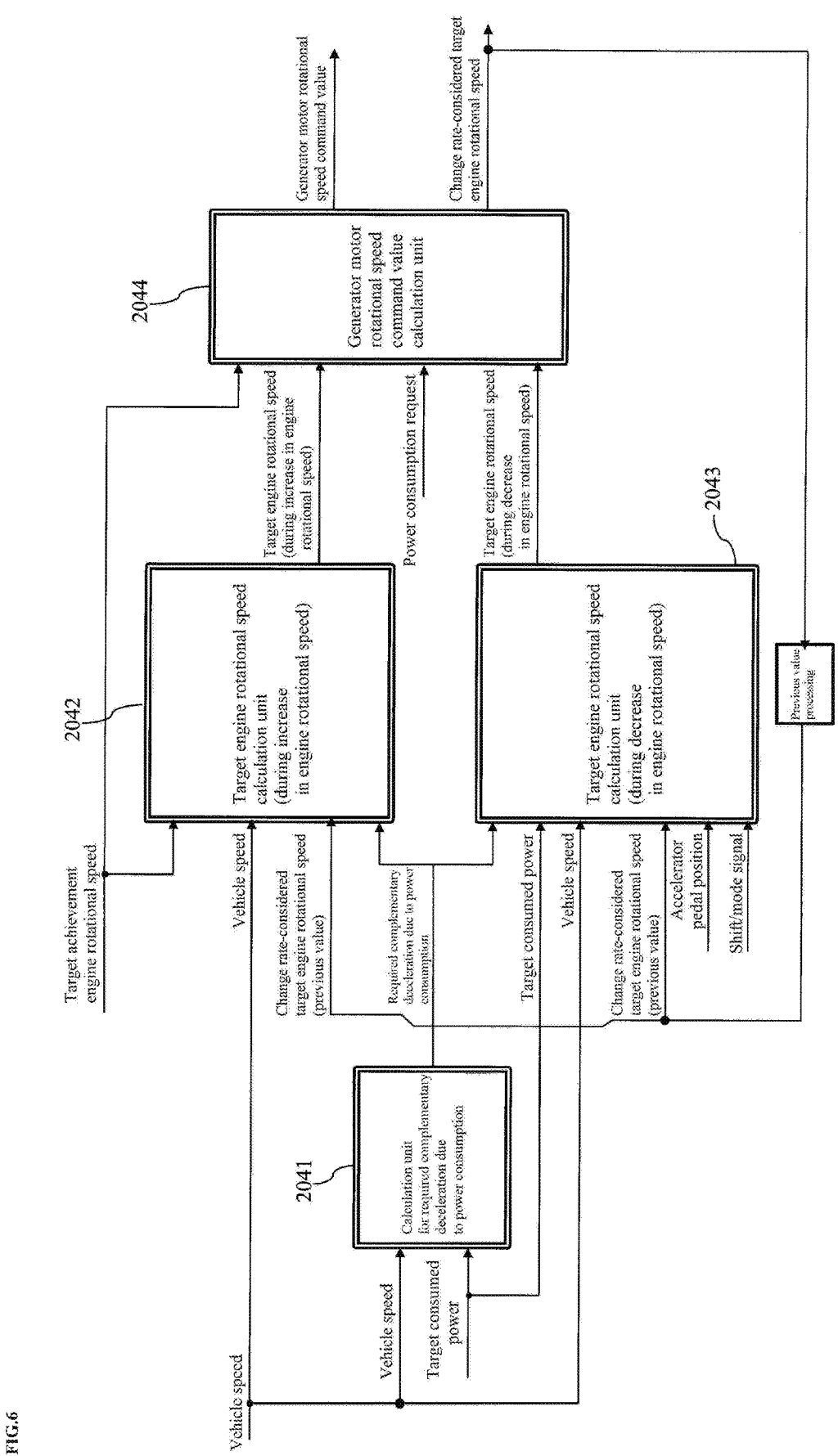
FIG. 6 is a control block diagram illustrating the main configuration of a change rate-considered target engine rotational speed calculation unit of FIG. 2.

FIG. 6 is a control block diagram illustrating a main configuration of the change rate-considered target engine rotational speed calculation unit 204 of FIG. 2. The change rate-considered target engine rotational speed calculation unit 204 includes a calculation unit 2041 for required complementary deceleration due to power consumption (this unit will be simply referred to as a required complementary deceleration calculation unit 2041, hereinafter), a target engine rotational speed calculation unit 2042, another target engine rotational speed calculation unit 2043, and a generator motor rotational speed command value calculation unit 2044. The vehicle speed from the vehicle speed sensor 26, the accelerator pedal position from the accelerator sensor 25, respective signals of the shift position and travel mode from the S/M sensor 27, the target consumed power from the target consumed power calculation unit 202, and the target achievement engine rotational speed from the target achievement engine rotational speed calculation unit 203 are input to the change rate-considered target engine rotational speed calculation unit 204, which executes the processes to be described below and then outputs the generator rotational speed command value to the generator controller 22. In the target engine rotational speed calculation units 2042 and 2043 of FIG. 6, the upper control block is responsible for a process when increasing the engine rotational speed while the lower control block is responsible for a process when decreasing the engine rotational speed. The processes executed by the required complementary deceleration calculation unit 2041, the target engine rotational speed calculation unit 2042, the target engine rotational speed calculation unit 2043, and the generator motor rotational speed command value calculation unit 2044 will be described below in this order.

Figure 7:
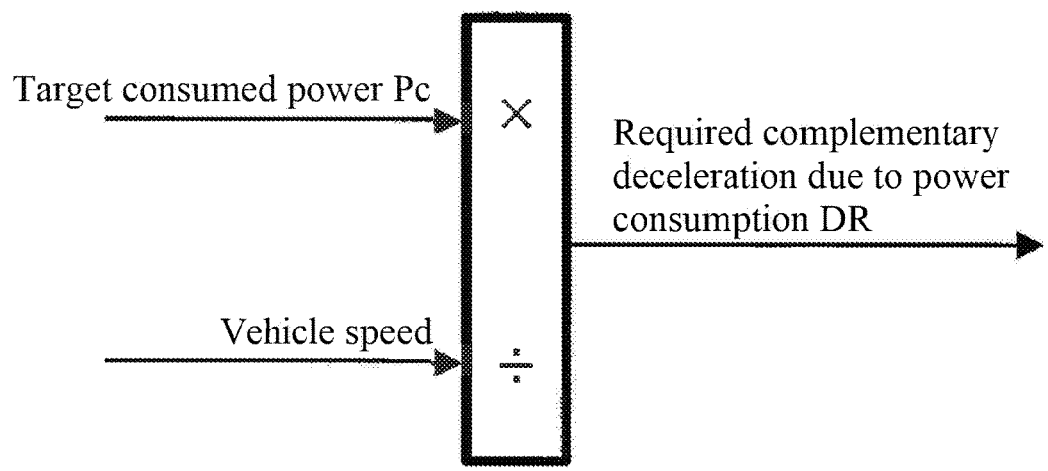
FIG. 7 is a control block diagram illustrating the main configuration of a calculation unit for required complementary deceleration due to power consumption of FIG. 6.

As illustrated in FIG. 7, the required complementary deceleration calculation unit 2041 divides the target consumed power Pc by the vehicle speed to calculate required complementary deceleration due to power consumption DR and outputs the calculated value. This allows the target consumed power to be converted into the required deceleration at the current vehicle speed. The target consumed power Pc refers to power consumed by the generator 12 driving the engine 11, which is obtained through calculating the required regenerative power from the target driving force Fd, that is, the required deceleration and subtracting the acceptable battery input power from the required regenerative power. Therefore the required complementary deceleration due to power consumption DR calculated by the required complementary deceleration calculation unit 2041 corresponds to the required deceleration by the driver, that is, the deceleration covered by the motoring control in the target driving force Fd. The required deceleration, or the target driving force Fd, and the required complementary deceleration due to power consumption may change in a similar manner because the acceptable battery input power does not rapidly change. For example, when the required deceleration, or the target driving force, increases, the required complementary deceleration due to power consumption also increases in its value in a similar manner. In the following description, the change (increase/decrease) in the required deceleration corresponds to any one of the change (increase/decrease) in the required complementary deceleration due to power consumption and the change increase/decrease) in the target driving force.

Figure 8:
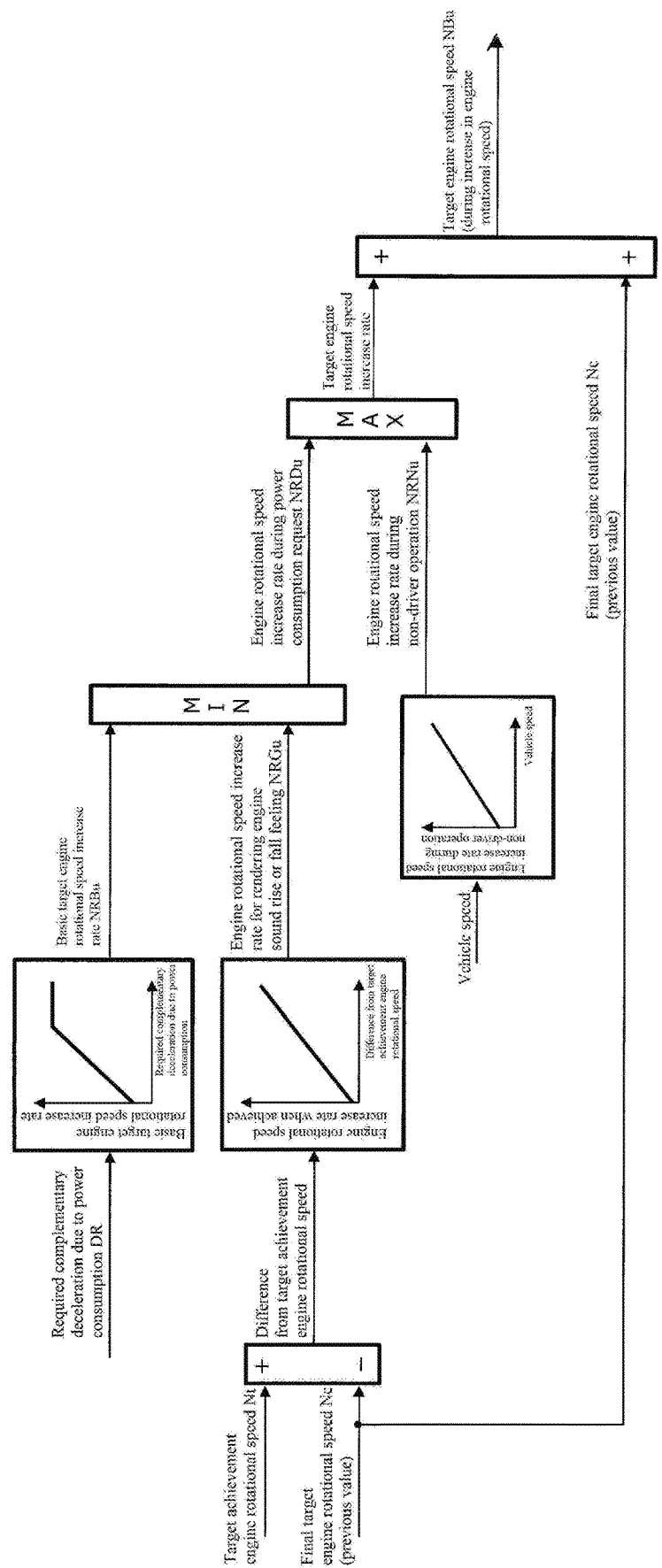
FIG. 8 is a control block diagram illustrating the main configuration of a target engine rotational speed calculation unit of FIG. 6.

As illustrated in FIG. 8, the vehicle speed, the target achievement engine rotational speed Nt, and the required complementary deceleration due to power consumption DR are input to the target engine rotational speed calculation unit 2042, which executes the calculation processes to be described below to calculate a target engine rotational speed NBu and outputs the target engine rotational speed NBu for the generator rotational speed command value. The vehicle controller 20 includes a memory, which stores a map that represents the relationship between the required deceleration due to power consumption and a basic target engine rotational speed increase rate (also referred to as a first map, hereinafter), a map that represents the relationship between a difference between the target achievement engine rotational speed and a final target engine rotational speed Nc corresponding to the actual engine rotational speed and an engine rotational speed increase rate at the time of achievement (also referred to as a second map, hereinafter), and a map that represents the relationship between the vehicle speed and an engine rotational speed increase rate during a non-driver operation (also referred to as a third map, hereinafter). These maps are illustrated in FIG. 8. The first map has a relationship in which the increase rate (change rate) of the engine rotational speed increases in proportion to the increase in the required complementary deceleration, while when the required complementary deceleration becomes a predetermined value or more, the increase rate of the engine rotational speed decreases. That is, the increase rate of the engine rotational speed increases as the required complementary deceleration increases, while when the required complementary deceleration is the predetermined value or more, the increase rate of the engine rotational speed is a small value. The second map has a relationship in which the increase rate of the engine rotational speed transitions in proportion to the difference between the target achievement engine rotational speed and the final target engine rotational speed. That is, the increase rate of the engine rotational speed decreases as the difference between the target achievement engine rotational speed and the final target engine rotational speed decreases. The third map has a relationship in which the engine rotational speed increase rate during non-driver operation transitions in proportion to the vehicle speed.

The required complementary deceleration due to power consumption DR is input to the target engine rotational speed calculation unit 2042, which refers to the illustrated first map to extract a basic target engine rotational speed increase rate NRBu. In addition, the target engine rotational speed calculation unit 2042 calculates the difference between the target achievement engine rotational speed and the final target engine rotational speed and refers to the second map with the calculated difference as the input to extract an engine rotational speed increase rate for rendering engine sound rise or fall feeling NRGu. Then, the target engine rotational speed calculation unit 2042 compares the basic target engine rotational speed increase rate NRBu with the engine rotational speed increase rate for rendering engine sound rise or fall feeling NRGu and selects a smaller increase rate (select-low logic). The selected increase rate is determined as an engine rotational speed increase rate during power consumption request NRDu.

When increasing the engine rotational speed according to the increase in the required complementary deceleration due to power consumption upon execution of the motoring control in which the accelerator pedal depression amount becomes a lower value from a higher value, for example, by the driver's operation, the vehicle controller 20 increases the engine rotational speed using the engine rotational speed increase rate so that the current engine rotational speed reaches the target achievement engine rotational speed. In this operation, the consumed power by driving the engine increases as the required complementary deceleration due to power consumption increases; therefore, in order to obtain a deceleration feel that does not give an uncomfortable feeling to the driver, the engine rotational speed may have to be promptly increased. Additionally or alternatively, in order to achieve an engine sound rise or fall feeling in the deceleration feel of the required complementary deceleration due to power consumption, the increase rate of the engine rotational speed may have to be gradually decreased with time.

At the start point at which the engine rotational speed starts to increase, the difference between the target rotational speed of the engine and the current engine rotational speed is large, so the engine rotational speed increase rate calculated using the second map is also large. Accordingly, the target engine rotational speed calculation unit 2042 selects the basic target engine rotational speed increase rate NRBu as the engine rotational speed increase rate during power consumption request NRDu. In the first map, as the required complementary deceleration due to power consumption increases, the engine rotational speed increase rate increases. When viewed from the start point of the increase in the engine rotational speed, the engine rotational speed changes at a high increase rate, and the increase rate increases as the required deceleration due to power consumption increases. This can alleviate the uncomfortable feeling given to the driver that the braking force is weak. Moreover, as time elapses from the start point of the increase in the engine rotational speed, the current engine rotational speed approaches the target rotational speed of the engine; therefore, the difference between the target rotational speed of the engine and the current engine rotational speed decreases, and the engine rotational speed increase rate NRGu calculated using the second map also decreases. Then, when the engine rotational speed increase rate NRGu becomes smaller than the engine rotational speed increase rate NRBu calculated using the first map, the required complementary deceleration calculation unit 2041 selects the engine rotational speed increase rate for rendering engine sound rise or fall feeling NRGu as the engine rotational speed increase rate during power consumption request NRDu. That is, as time elapses from the start point of the increase in the engine rotational speed and the current engine rotational speed approaches the target rotational speed of the engine, the increase rate of the rotational speed decreases, and the deceleration feel can thus be achieved with the engine sound rise or fall feeling.

The target engine rotational speed calculation unit 2042 refers to the third map with the vehicle speed as the input to extract an engine rotational speed increase rate during non-driver operation NRNu. The engine rotational speed increase rate during non-driver operation NRNu is an engine rotational speed increase rate when the engine rotational speed is increased due to a requirement other than the driver requirement, such as a system requirement. The target engine rotational speed calculation unit 2042 compares the engine rotational speed increase rate during power consumption request with the engine rotational speed increase rate during non-driver operation and sets the higher rotational speed increase rate as the target engine rotational speed increase rate. The target engine rotational speed calculation unit 2042 multiplies the target engine rotational speed increase rate to the final target engine rotational speed (previous value) to calculate the target engine rotational speed.

Figure 9:
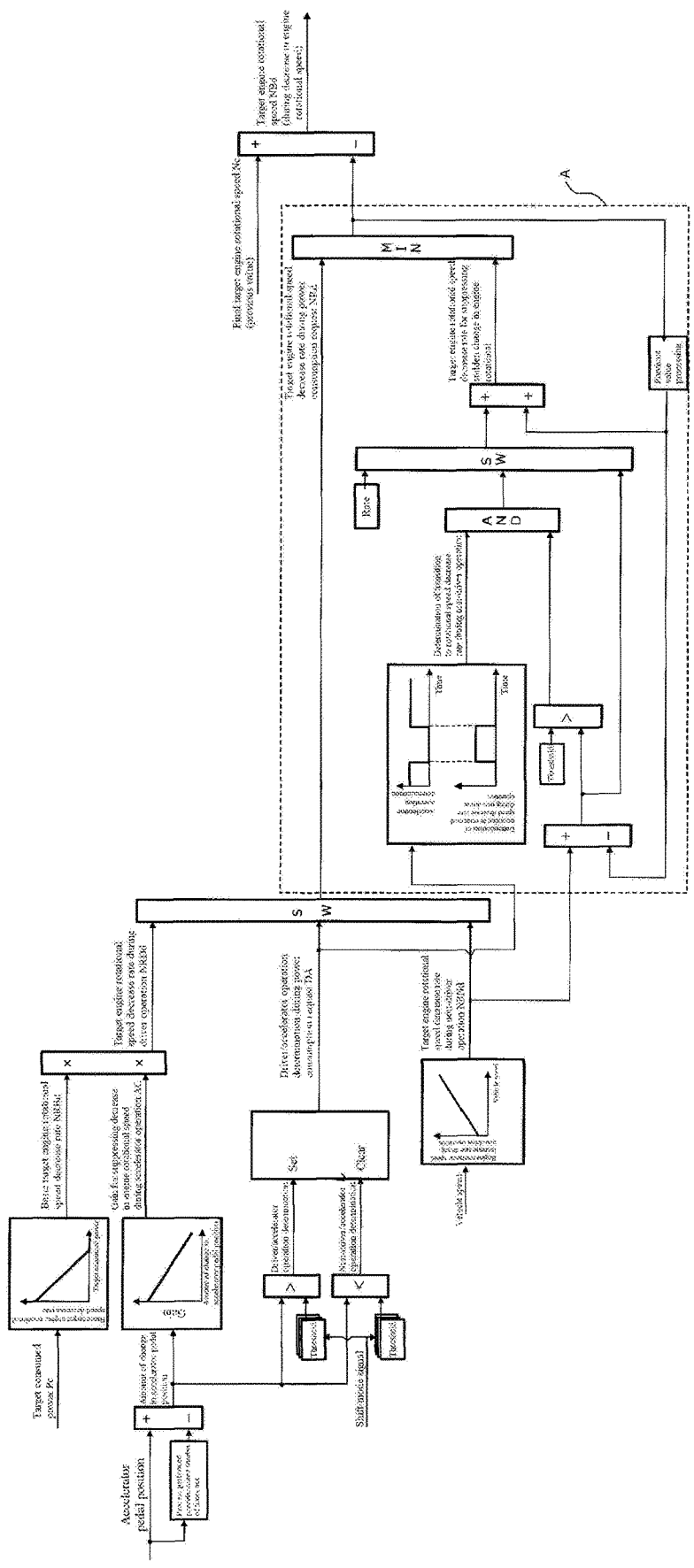
FIG. 9 is a control block diagram illustrating the main configuration of another target engine rotational speed calculation unit of FIG. 6.

As illustrated in FIG. 9, the target consumed power Pc, the vehicle speed, the change rate-considered target engine rotational speed (previous value), the accelerator pedal position, and the shift/mode signal are input to the target engine rotational speed calculation unit 2043, which executes the calculation processes to be described below to calculate the target engine rotational speed and outputs the target engine rotational speed for the generator rotational speed command value.

The vehicle controller 20 includes a memory, which stores a map that represents the relationship between the target consumed power and a basic target engine rotational speed decrease rate (referred to as a fourth map, hereinafter), a map that represents the relationship between an amount of change in the accelerator pedal position and a gain (referred to as a fifth map, hereinafter), and a map that represents the relationship between the vehicle speed and the engine rotational speed increase rate during non-driver operation (referred to as a sixth map, hereinafter). These maps are illustrated in FIG. 9.

The fourth map has a relationship in which the basic target engine rotational speed decrease rate decreases in proportion to the increase in the target consumed power, while when the target consumed power becomes a predetermined threshold or more, the basic target engine rotational speed decrease rate becomes zero. That is, when the target consumed power is a predetermined value or more, the decrease rate of the engine rotational speed is a constant rate. In the fourth map, when the target consumed power becomes the predetermined threshold or more, the basic target engine rotational speed decrease rate may not necessarily become zero (or a constant rate) and it suffices that the basic target engine rotational speed decrease rate becomes smaller than the rotational speed decrease rate when the target consumed power is higher than the predetermined threshold. The fifth map has a relationship in which the gain decreases in proportion to the increase in the amount of change in the accelerator pedal position. The gain is a gain for suppressing the decrease in the engine rotational speed during the accelerator operation. The sixth map has a relationship in which the engine rotational speed increase rate during the non-driver operation transitions in proportion to the vehicle speed.

The target engine rotational speed calculation unit 2043 refers to the illustrated fourth map with the target consumed power Pc as the input to extract a basic target engine rotational speed decrease rate NRBd.

When the required complementary deceleration due to power consumption is large in the motoring control state, the engine rotational speed is large and the driver can hear the engine rotation sound. When the accelerator operation is performed in the state in which the motoring control is continued, the required complementary deceleration due to power consumption decreases. At this time, if the engine rotational speed is changed so as to correspond to the change in the required complementary deceleration due to power consumption at the timing at which the accelerator operation is performed, an uncomfortable feeling may be given to the driver. To alleviate such an uncomfortable feeling, it is necessary to restrict the change in the engine rotational speed when the required complementary deceleration due to power consumption decreases during the execution of the motoring control. Furthermore, when the driver depresses the accelerator pedal due to an acceleration request in the motoring control state, if the engine rotational speed is not promptly decreased, the engine rotational speed will not increase during subsequent acceleration, and an uncomfortable feeling may be given to the driver. To alleviate such an uncomfortable feeling, it is necessary to increase the decrease rate of the engine rotational speed as the required complementary deceleration due to power consumption decreases during the execution of the motoring control.

The driver operates the accelerator in a state in which the motoring control is performed and the engine rotational speed is high. At this time, the accelerator pedal position is a less depressed position and the motoring control is continued. The operation of depressing the accelerator pedal reduces the target consumed power Pc, but the degree of decrease in the target consumed power is small because the accelerator pedal position is still a less depressed position. In the fourth map, when the target consumed power Pc is higher than a predetermined value (in the fourth map illustrated in FIG. 9, the consumed power corresponding to the folding point of the graph), the engine rotational speed decrease rate is set to a small value (zero in the example of FIG. 9). At the time point at which the accelerator operation is started, therefore, the decrease rate of the engine rotational speed is a small value when the target consumed power Pc is the predetermined value or more, and the change in the engine rotational speed is restricted. This can suppress the decrease in the engine rotational speed and alleviate the uncomfortable feeling given to the driver.

Furthermore, in the fourth map, when the target consumed power Pc becomes lower than the predetermined value, the engine rotational speed decrease rate increases, and as the target consumed power Pc decreases, the engine rotational speed decrease rate increases. This allows the engine rotational speed to rapidly decrease after the restriction on the change in the engine rotational speed is released; therefore, the engine rotational speed can be increased during acceleration, and the uncomfortable feeling given to the driver can be alleviated.

The target engine rotational speed calculation unit 2043 obtains a difference between the current accelerator pedal position and the accelerator pedal position at the time of performing the process a predetermined number of times ago and calculates the amount of change in the accelerator pedal position. The accelerator pedal position at the time of performing the process a predetermined number of times ago may be the accelerator pedal position at the time of the previous process or may also be the average of a plurality of accelerator pedal positions obtained in the processes prior to the latest process. The target engine rotational speed calculation unit 2043 refers to the fifth map to extract a gain AG corresponding to the amount of change in the accelerator pedal position. The target engine rotational speed calculation unit 2043 multiplies the basic target engine rotational speed decrease rate NRBd calculated using the fourth map by the gain AG to calculate a target engine rotational speed decrease rate during driver operation NRDd.

The target engine rotational speed calculation unit 2043 compares the amount of change in the accelerator pedal position with a threshold. The threshold is set for each travel mode, and the target engine rotational speed calculation unit 2043 extracts the threshold corresponding to the travel mode. When the amount of change in the accelerator pedal position is higher than the threshold, a flag indicating a result of determining the driver's accelerator operation is made to be a set state. The set state indicates that the driver performs an accelerator operation. On the other hand, when the amount of change in the accelerator pedal position is lower than the threshold, the flag indicating the result of determining the driver's accelerator operation is made to be a clear state. The clear state indicates that the driver does not perform an accelerator operation.

When the flag indicating the result of determining the accelerator operation is in the set state, the target engine rotational speed calculation unit 2043 sets the target engine rotational speed decrease rate during driver operation NRDd as a target engine rotational speed decrease rate during power consumption request NRd. On the other hand, when the flag indicating the result of determining the accelerator operation is in the clear state, the target engine rotational speed calculation unit 2043 sets a target engine rotational speed decrease rate during non-driver operation NRNd as the target engine rotational speed decrease rate during power consumption request NRd.

In addition, when the flag indicating the result of determining the accelerator operation is in the clear state, the target engine rotational speed calculation unit 2043 executes the following calculation processes. The target engine rotational speed calculation unit 2043 subtracts the target engine rotational speed decrease rate in the previous process from the target engine rotational speed decrease rate during non-driver operation and compares the value obtained by the subtraction (also referred to as an "amount of change in the engine rotational speed decrease rate with respect to the previous value," hereinafter) with a threshold. When the value obtained by the subtraction is larger than the threshold, the target engine rotational speed calculation unit 2043 performs calculation with a logical value "1," while when the value obtained by the subtraction is not larger than the threshold, the target engine rotational speed calculation unit 2043 performs calculation with a logical value "0."

The target engine rotational speed calculation unit 2043 performs a NOT calculation process on the flag indicating the result of determining the accelerator operation and inverts the flag indicating the result of determining the accelerator operation. That is, as illustrated in FIG. 9, when there is no driver operation, the flag (determination of transition to the engine rotational speed decrease rate during non-driver operation) becomes "1," while when there is a driver operation, the flag (determination of transition to the engine rotational speed decrease rate during non-driver operation) becomes "0." The target engine rotational speed calculation unit 2043 performs an AND calculation process on the logical value indicating the magnitude of the amount of change in the rotational speed decrease rate and the flag. When both the logical value indicating the amount of change in the rotational speed decrease rate and the flag (determination of transition to the engine rotational speed decrease rate during non-driver operation) are "1," the target engine rotational speed calculation unit 2043 switches a switch (SW) so that a predetermined rate is output. The rate is a value for suppressing the decrease rate of the engine rotational speed when the driver does not perform the accelerator operation and smoothly changing the engine rotational speed. The rate is preliminarily set and is set, for example, to a fixed value smaller than 1. Then, the target engine rotational speed calculation unit 2043 adds the rate to the target engine rotational speed decrease rate in the previous process to calculate a target engine rotational speed decrease rate for suppressing sudden change in engine rotational speed NRkd (also referred to as target engine rotational speed decrease rate for suppression, hereinafter). When one of the logical value indicating the amount of change in the rotational speed decrease rate and the flag (determination of transition to the engine rotational speed decrease rate during non-driver operation) is "0," the target engine rotational speed calculation unit 2043 switches the switch (SW) so that the amount of change in the engine rotational speed decrease rate with respect to the previous value is output. Then, the target engine rotational speed calculation unit 2043 adds the amount of change in the engine rotational speed decrease rate with respect to the previous value to the target engine rotational speed decrease rate in the previous process to obtain the target engine rotational speed decrease rate for suppressing sudden change in engine rotational speed NRkd.

The target engine rotational speed calculation unit 2043 compares the target engine rotational speed decrease rate during power consumption request NRd with the target engine rotational speed decrease rate for suppression NRkd and selects a smaller rotational speed decrease rate (select-low logic). When the calculation process is repeatedly executed by the target engine rotational speed calculation unit 2043 in a state in which the switch (SW) is switched so that the predetermined rate is output, the target engine rotational speed decrease rate for suppression NRkd gradually increases due to addition of the rate. Then, when the target engine rotational speed decrease rate for suppression NRkd becomes larger than the target engine rotational speed decrease rate during power consumption request NRd, the target engine rotational speed decrease rate during power consumption request NRd is selected by subjecting the target engine rotational speed decrease rate during power consumption request NRd and the target engine rotational speed decrease rate for suppression NRkd to the select-low logic. The target engine rotational speed calculation unit 2043 multiplies the selected target decrease rate from the final target engine rotational speed (previous value) to calculate a target engine rotational speed NBd.

Here, the operation of the portion surrounded by dotted line A in the control blocks illustrated in FIG. 9 will be described. As described above, in the case in which the driver depresses the accelerator pedal due to an acceleration request from the state in which the engine rotational speed is high under the motoring control, when the required complementary deceleration due to power consumption decreases and a driving request is issued to the engine 11, the engine rotational speed decrease rate becomes constant thereby to restrict the change in the engine rotational speed. Then, when the target consumed power due to the driving of the engine 11 decreases, the restriction on the change in the engine rotational speed is released, and the engine rotational speed rapidly decreases. In this operation, when the driver keeps the accelerator pedal position constant, for example, the increase in the accelerator pedal depression amount is suppressed, and the required complementary deceleration due to power consumption becomes constant. Then, when the amount of change in the accelerator pedal position is lower than the threshold, the flag indicating the result of the determining the accelerator operation by the driver is in a state in which no driver operation is performed. In addition, the target consumed power due to the driving of the engine 11 is not zero and the engine rotational speed continues to decrease; therefore, the difference between the target engine rotational speed decrease rate during non-driver operation and the target engine rotational speed decrease rate during the previous process becomes larger than the threshold, and the logical value turns to "1." The AND condition between the logical value indicating the magnitude of the amount of change in the rotational speed decrease rate and the flag (determination of transition to the engine rotational speed decrease rate during non-driver operation) is satisfied, and the rate is added to the decrease rate of the engine rotational speed to suppress the amount of decrease in the engine rotational speed. Through this operation, when the required complementary deceleration due to power consumption becomes constant while the engine rotational speed is rapidly decreasing after the restriction on the change in the engine rotational speed is released, the decrease rate of the engine rotational speed decreases. In other words, when the change in the required deceleration is suspended and the required complementary deceleration due to power consumption becomes constant, the slope in the decreasing direction of the engine rotational speed becomes moderate.

Figure 10:
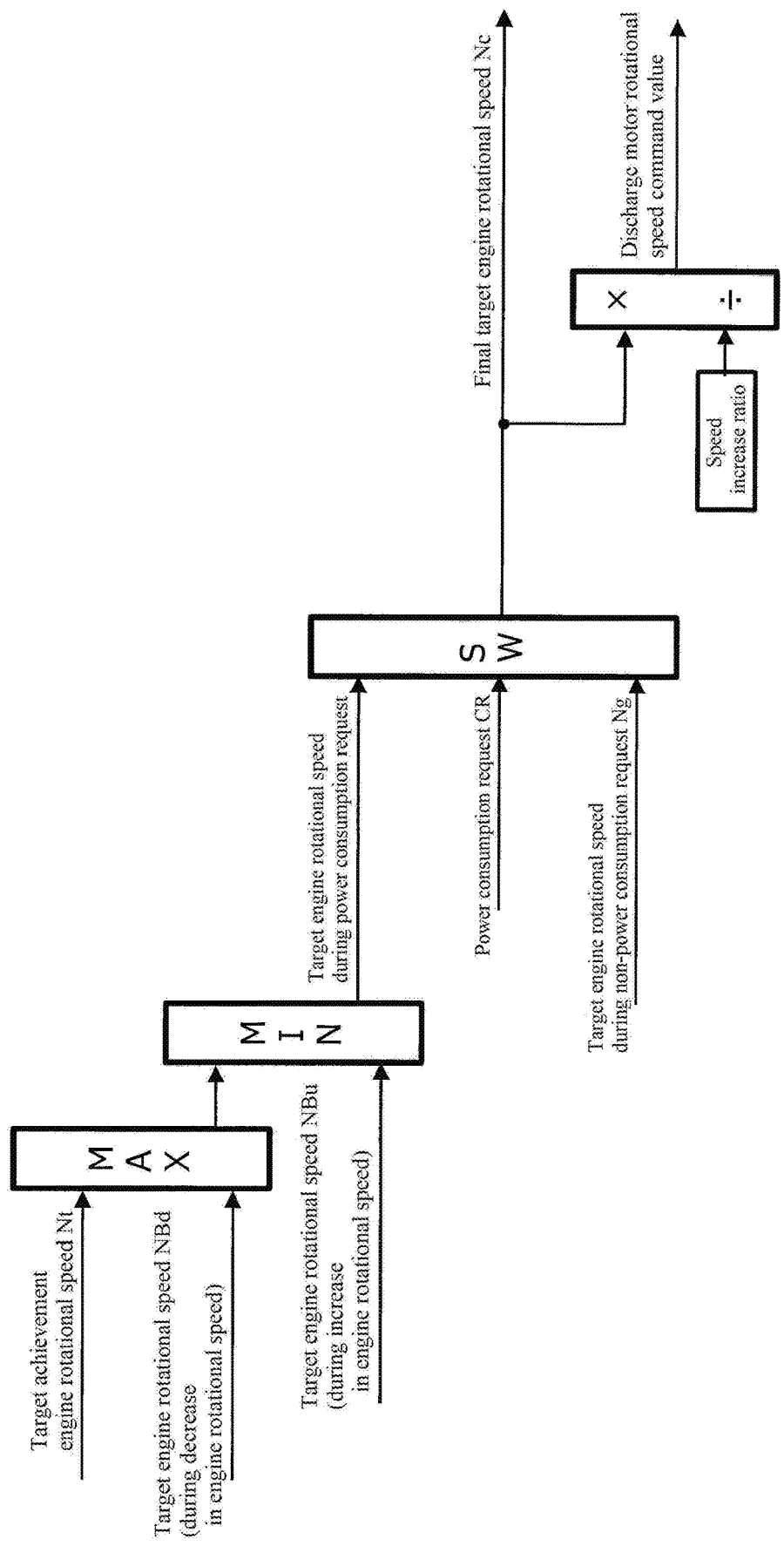
FIG. 10 is a control block diagram illustrating the configuration of a generator motor rotational speed command value calculation unit of FIG. 6.

As illustrated in FIG. 10, the target achievement engine rotational speed, the target engine rotational speed (during increase in the engine rotational speed) NBu, the target engine rotational speed (during decrease in the engine rotational speed) NBd, and the power consumption request CR are input to the generator motor rotational speed command value calculation unit 2044, which executes the calculation processes to be described below to calculate the final target engine rotational speed Nc and the generator motor rotational speed command value, outputs the final target engine rotational speed Nc to the target driving motor torque calculation unit 205, and outputs the generator motor rotational speed command value to the generator controller 22.

The generator motor rotational speed command value calculation unit 2044 compares the target achievement engine rotational speed Nt with the target engine rotational speed (during decrease in the engine rotational speed) NBd. When the target achievement engine rotational speed Nt is lower than the target engine rotational speed (during decrease in the engine rotational speed) NBd, the generator motor rotational speed command value calculation unit 2044 sets the target engine rotational speed (during decrease in the engine rotational speed) NBd as a target engine rotational speed during power consumption request. In addition, the generator motor rotational speed command value calculation unit 2044 compares the target achievement engine rotational speed Nt with the target engine rotational speed (during increase in the engine rotational speed) NBu. When the target achievement engine rotational speed Nt is higher than the target engine rotational speed (during increase in the engine rotational speed) NBu, the generator motor rotational speed command value calculation unit 2044 sets the target engine rotational speed (during increase in the engine rotational speed) NBu as the target engine rotational speed during power consumption request. When there is a power consumption request, the generator motor rotational speed command value calculation unit 2044 sets the target engine rotational speed during power consumption request as the final target engine rotational speed Nc. When there is no power consumption request, the generator motor rotational speed command value calculation unit 2044 sets the target engine rotational speed during non-power consumption request as the final target engine rotational speed Nc.

The generator motor rotational speed command value calculation unit 2044 divides the final target engine rotational speed Nc by the speed increase ratio to calculate the generator motor rotation command value.

Figure 11:
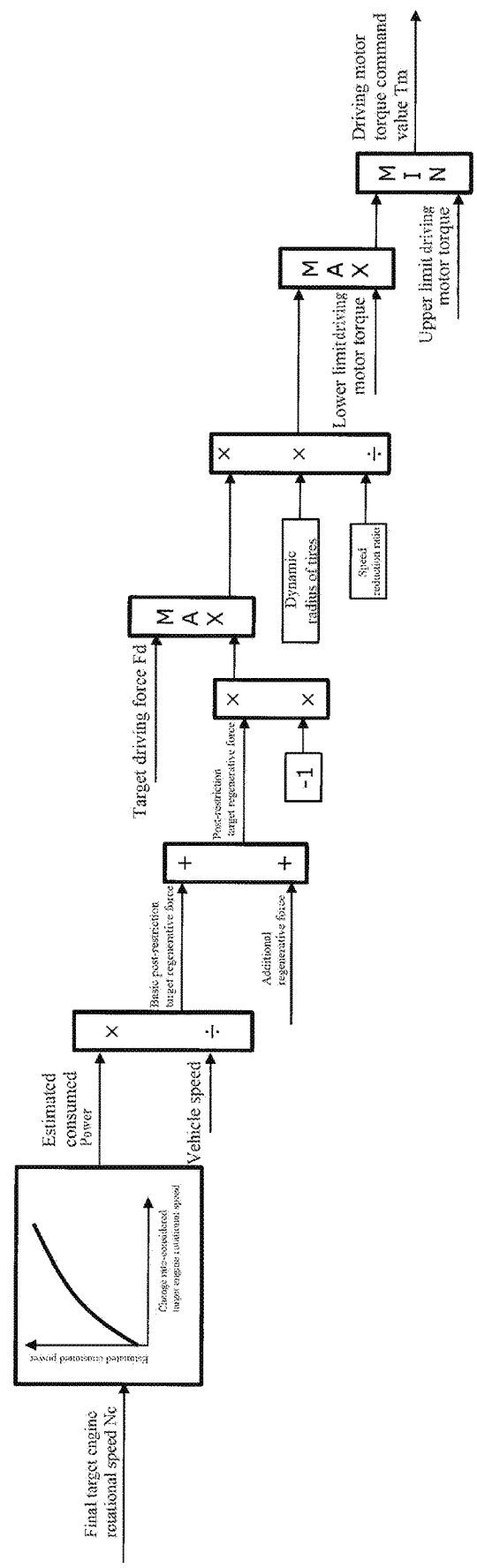
FIG. 11 is a control block diagram illustrating the main configuration of a target driving motor torque calculation unit of FIG. 2.

FIG. 11 is a control block diagram illustrating a main configuration of the target driving motor torque calculation unit 205 of FIG. 2. The vehicle controller 20 includes a memory, which stores a control map of estimated consumed power with respect to the target engine rotational speed as the change rate-considered target engine rotational speed, as illustrated in FIG. 11. The change rate-considered target engine rotational speed corresponds to the final target engine rotational speed Nc calculated by the generator motor rotational speed command value calculation unit 2044. The target engine rotational speed Nc as the change rate-considered target is input to the target driving motor torque calculation unit 205, which refers to the control map illustrated in FIG. 11 to calculate the estimated consumed power. The estimated consumed power is an estimated value of the consumed power by the generator driving the engine 11.

To convert estimated consumed power into the driving force, the target driving motor torque calculation unit 205 divides the estimated consumed power by the vehicle speed to calculate basic post-restriction target regenerative force. The target driving motor torque calculation unit 205 adds additional regenerative force to the basic post-restriction regenerative force to calculate post-restriction regenerative force. The additional regenerative force represents the power required to operate an auxiliary machine and the like and the force corresponding to the friction from the electric motor to the battery. To make the post-restriction target regenerative force a value in the regenerative direction, the target driving motor torque calculation unit 205 multiplies "−1" by the post-restriction target regenerative force and subjects the value obtained by the multiplication and the target driving force to the select-high logic. Furthermore, the target driving motor torque calculation unit 205 converts the selected force in the unit into target driving motor torque using the dynamic radius of the drive wheels 15 and the speed reduction ratio of the speed-down gear 132. The target driving motor torque calculation unit 205 compares the target driving motor torque with lower limit driving motor torque. When the target driving motor torque is smaller than the lower limit driving motor torque, the target driving motor torque calculation unit 205 sets the lower limit driving motor torque as a driving motor torque command value Tm. In addition, the target driving motor torque calculation unit 205 compares the target driving motor torque with upper limit driving motor torque. When the target driving motor torque is larger than the upper limit driving motor torque, the target driving motor torque calculation unit 205 sets the upper limit driving motor torque as the driving motor torque command value Tm. The lower limit driving motor torque and the upper limit driving motor torque are determined in accordance with requirements for protecting the vehicle components and the like.

Figure 12A:
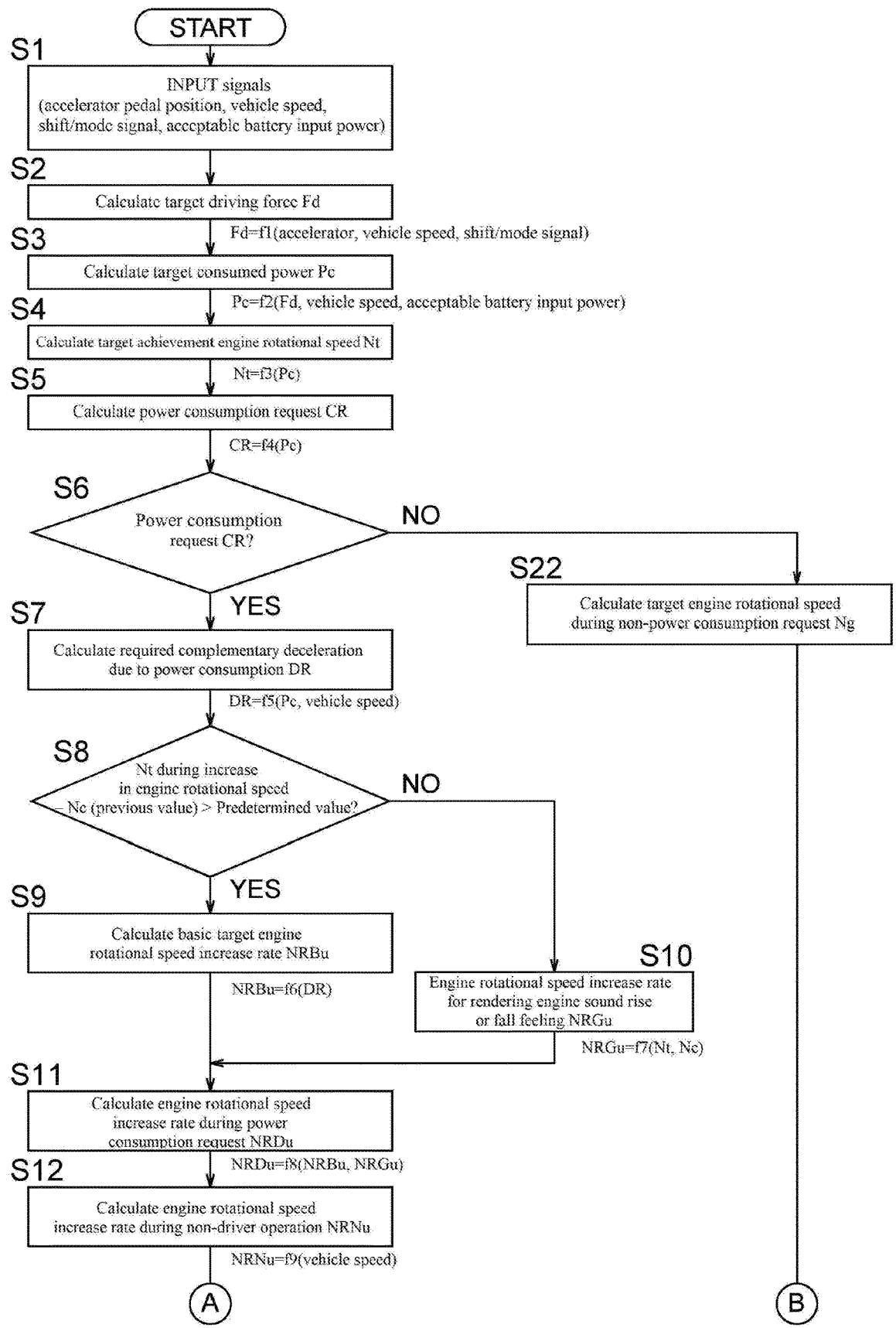
FIG. 12A is a flowchart illustrating the main processing content executed by a vehicle controller of FIGS. 1 and 2.
Figure 12B:
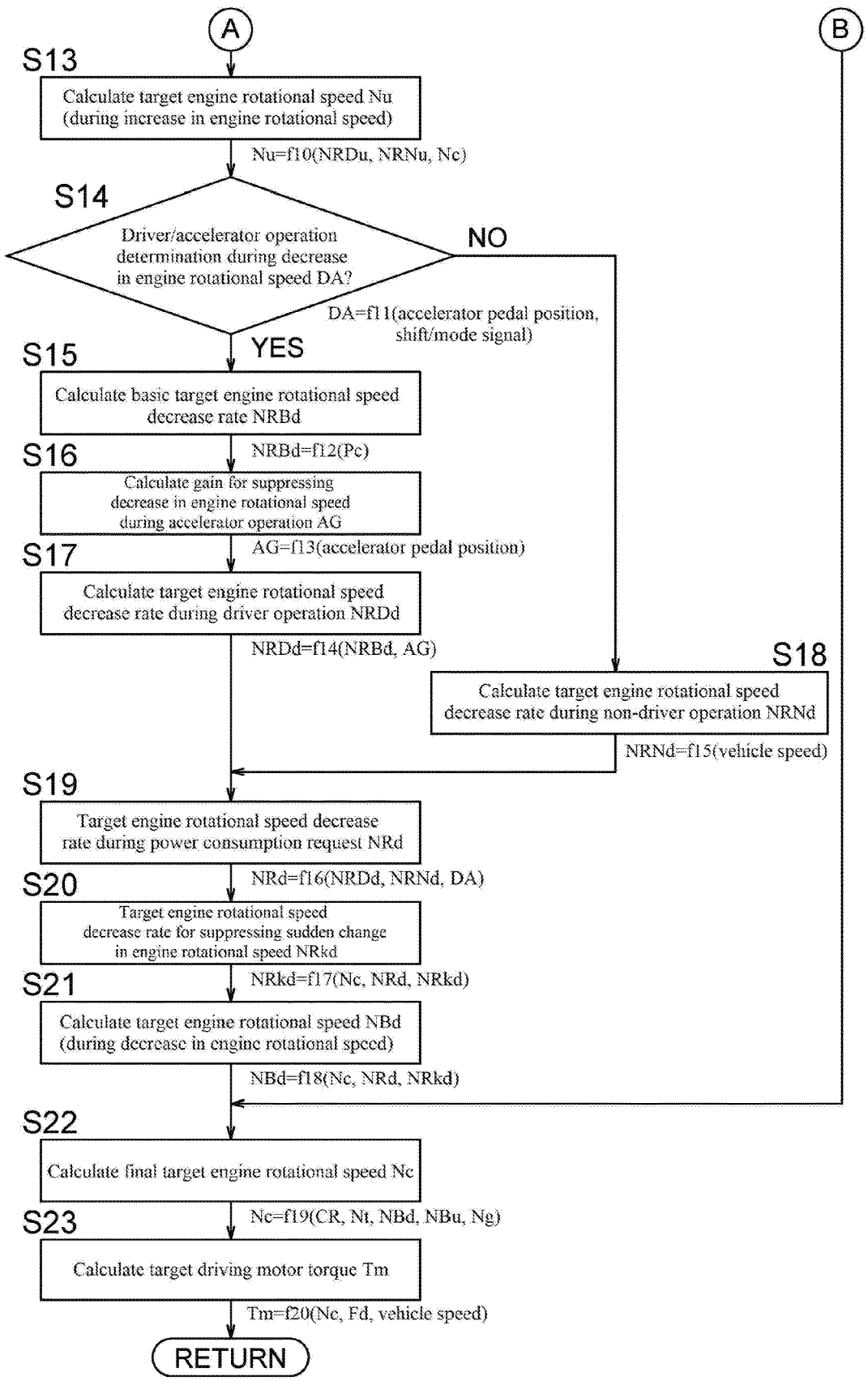
FIG. 12B is a flowchart illustrating the main processing content executed by the vehicle controller of FIGS. 1 and 2.

A flow of the control processes executed by the vehicle controller 20 will then be described. FIG. 12A and FIG. 12B are flowcharts illustrating the processing content executed by the vehicle controller 20. The processes in the flowchart of FIG. 12A and FIG. 12B are repeated at time intervals of, for example, 10 msec.

In step S1, respective signals of the accelerator pedal position from the accelerator sensor 25, the vehicle speed from the vehicle speed sensor 26, and the travel mode from the S/M sensor 27 and the acceptable battery input power from the battery controller 23 are input to the target driving force calculation unit 201. In step S2, the target driving force calculation unit 201 executes the processes illustrated in FIG. 3 to obtain the target driving force Fd.

In step S3, the target consumed power calculation unit 202 executes the processes illustrated in FIG. 4 to calculate the target consumed power Pc. In step S4, the target achievement engine rotational speed calculation unit 203 executes the processes illustrated in FIG. 5 to calculate the target achievement engine rotational speed Nt. In step S5, the target consumed power calculation unit 202 executes the processes illustrated in FIG. 4 to calculate the power consumption request.

In step S6, a determination is made as to whether or not there is a power consumption request. When a determination is made that there is a power consumption request, the process proceeds to step S7, while when a determination is made that there is no power consumption request, the process proceeds to step S22. In step S7, the calculation unit 2041 for required complementary deceleration due to power consumption executes the processes illustrated in FIG. 7 to calculate the required complementary deceleration due to power consumption. In step S8, the target engine rotational speed calculation unit 2042 calculates the difference between the target achievement engine rotational speed Nt calculated by the calculation processes of step S4 and the previous value of the final target engine rotational speed Nc. When the difference is larger than a predetermined value, the process proceeds to step S9, while when the difference is not larger than the predetermined value, the process proceeds to step S10.

In step S9, the required complementary deceleration due to power consumption is input to the target engine rotational speed calculation unit 2042, which refers to the first map illustrated in FIG. 8 to calculate the basic target engine rotational speed increase rate NRBu. In step S10, on the basis of the difference (Nt−Nc) between the target achievement engine rotational speed and the actual engine rotational speed, the target engine rotational speed calculation unit 2042 refers to the second map illustrated in FIG. 8 to calculate the engine rotational speed increase rate for rendering engine sound rise or fall feeling NRGu. In step S11, the target engine rotational speed calculation unit 2042 executes the processes illustrated in FIG. 8 to calculate the engine rotational speed increase rate during power consumption request NRDu. In step S12, the vehicle speed is input to the target engine rotational speed calculation unit 2042, which refers to the third map illustrated in FIG. 8 to calculate the engine rotational speed increase rate during non-driver operation NRNu. In step S13, the target engine rotational speed calculation unit 2042 executes the processes illustrated in FIG. 8 to calculate the target engine rotational speed NBu.

In step S14, on the basis of the state of the flag indicating the driver/accelerator operation determination made when the power consumption is requested, the target engine rotational speed calculation unit 2043 determines whether or not there is an accelerator operation by the driver during the engine rotational speed decrease. When a determination is made that there is an accelerator operation, the process proceeds to step S15, while when a determination is made that there is no accelerator operation, the process proceeds to step S18.

In step S15, the target engine rotational speed calculation unit 2043 refers to the fourth map illustrated in FIG. 9 with the target consumed power Pc as the input to calculate the basic target engine rotational speed decrease rate NRBd. In step S16, the target engine rotational speed calculation unit 2043 refers to the fifth map illustrated in FIG. 8 to calculate the gain corresponding to the amount of change in the accelerator pedal position.

In step S17, the target engine rotational speed calculation unit 2043 executes the processes illustrated in FIG. 9 to calculate the target engine rotational speed decrease rate at the time of the driver operation determination. In step S18, the target engine rotational speed calculation unit 2043 refers to the sixth map illustrated in FIG. 9 with the vehicle speed as the input to calculate the target engine rotational speed decrease rate during non-driver operation.

In step S19, the target engine rotational speed calculation unit 2043 executes the processes illustrated in FIG. 9 to calculate the target engine rotational speed decrease rate during power consumption request. In step S20, the target engine rotational speed calculation unit 2043 executes the processes illustrated in FIG. 9 to calculate the target engine rotational speed decrease rate for suppressing sudden change in engine rotational speed NRkd. In step S21, the target engine rotational speed calculation unit 2043 executes the processes illustrated in FIG. 9 to calculate the target engine rotational speed NBd.

In step S22, the generator motor rotational speed command value calculation unit 2044 execute the processes illustrated in FIG. 10 to calculate the final target engine rotational speed Nc. In step S23, the target driving motor torque calculation unit 205 executes the processes illustrated in FIG. 11 to calculate the driving motor torque command value Tm.

Figure 13:
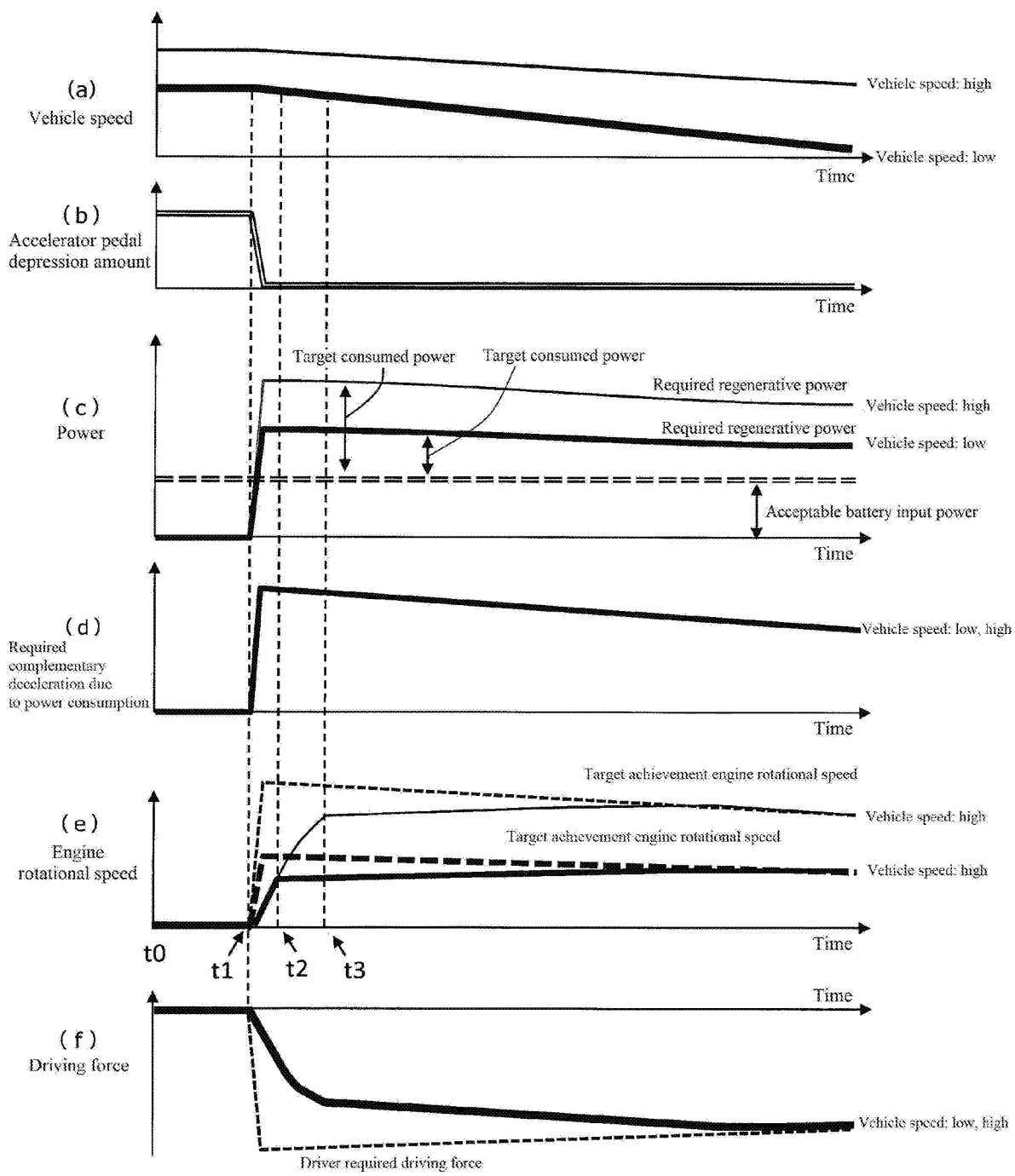
FIG. 13 is a set of time charts illustrating behaviors of respective parameters in a typical scene (during regeneration) for the hybrid vehicle illustrated in FIG. 1.
Figure 14:
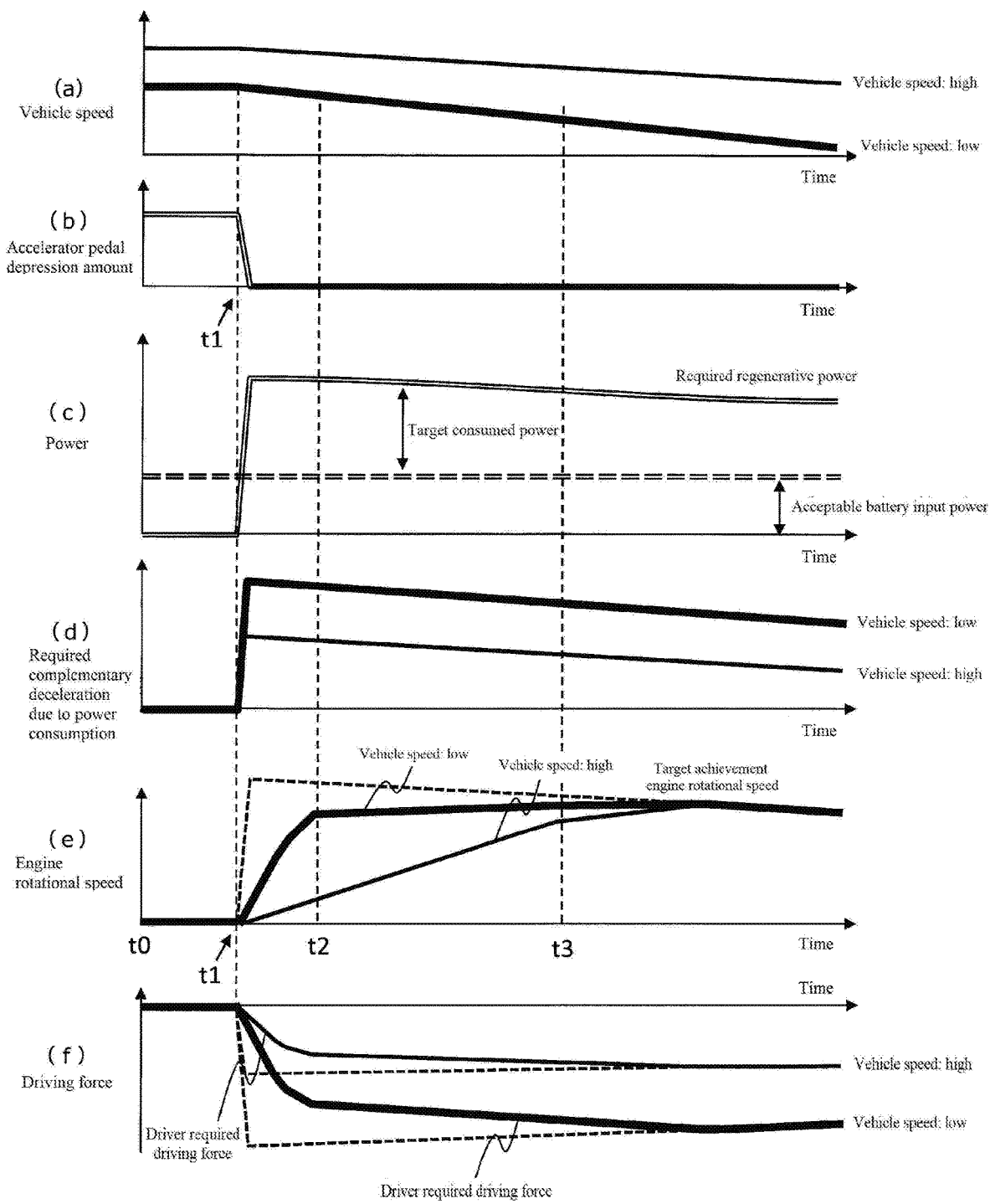
FIG. 14 is a set of time charts illustrating behaviors of respective parameters in a typical scene (during regeneration) for the hybrid vehicle illustrated in FIG. 1.
Figure 15:
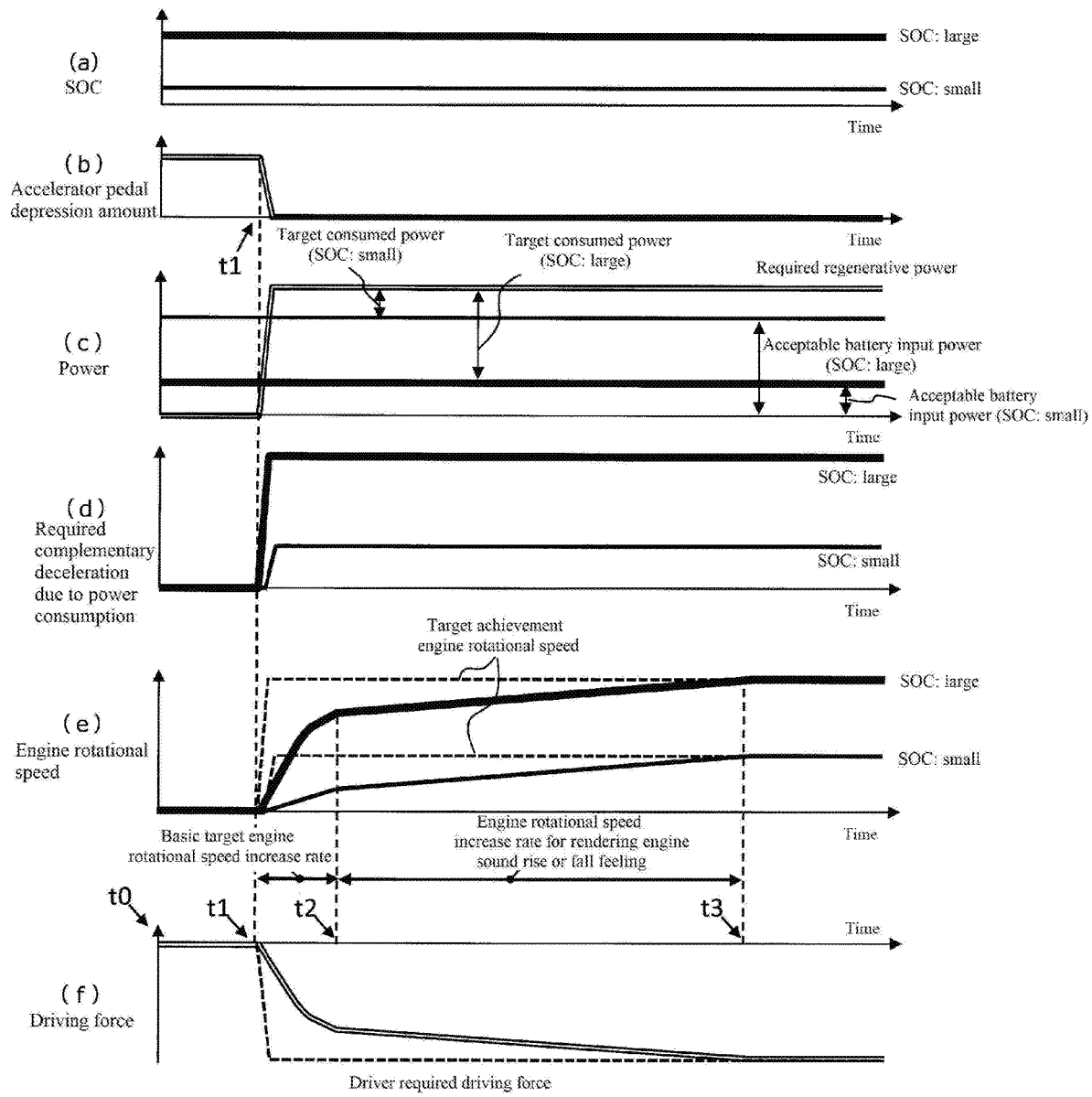
FIG. 15 is a set of time charts illustrating behaviors of respective parameters in a typical scene (during regeneration) for the hybrid vehicle illustrated in FIG. 1.
Figure 16:
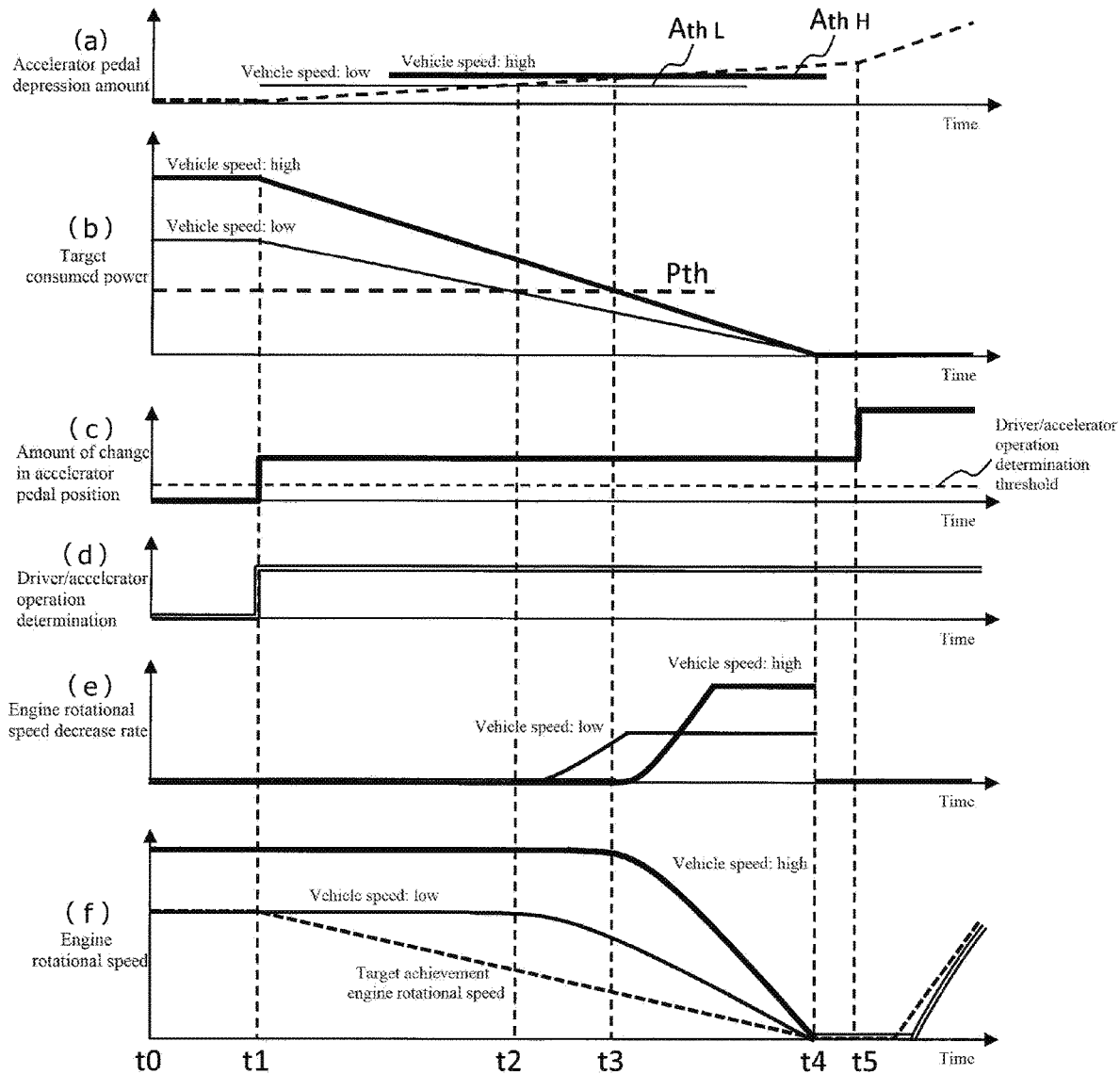
FIG. 16 is a set of time charts illustrating behaviors of respective parameters in a typical scene (during regeneration) for the hybrid vehicle illustrated in FIG. 1.
Figure 17:
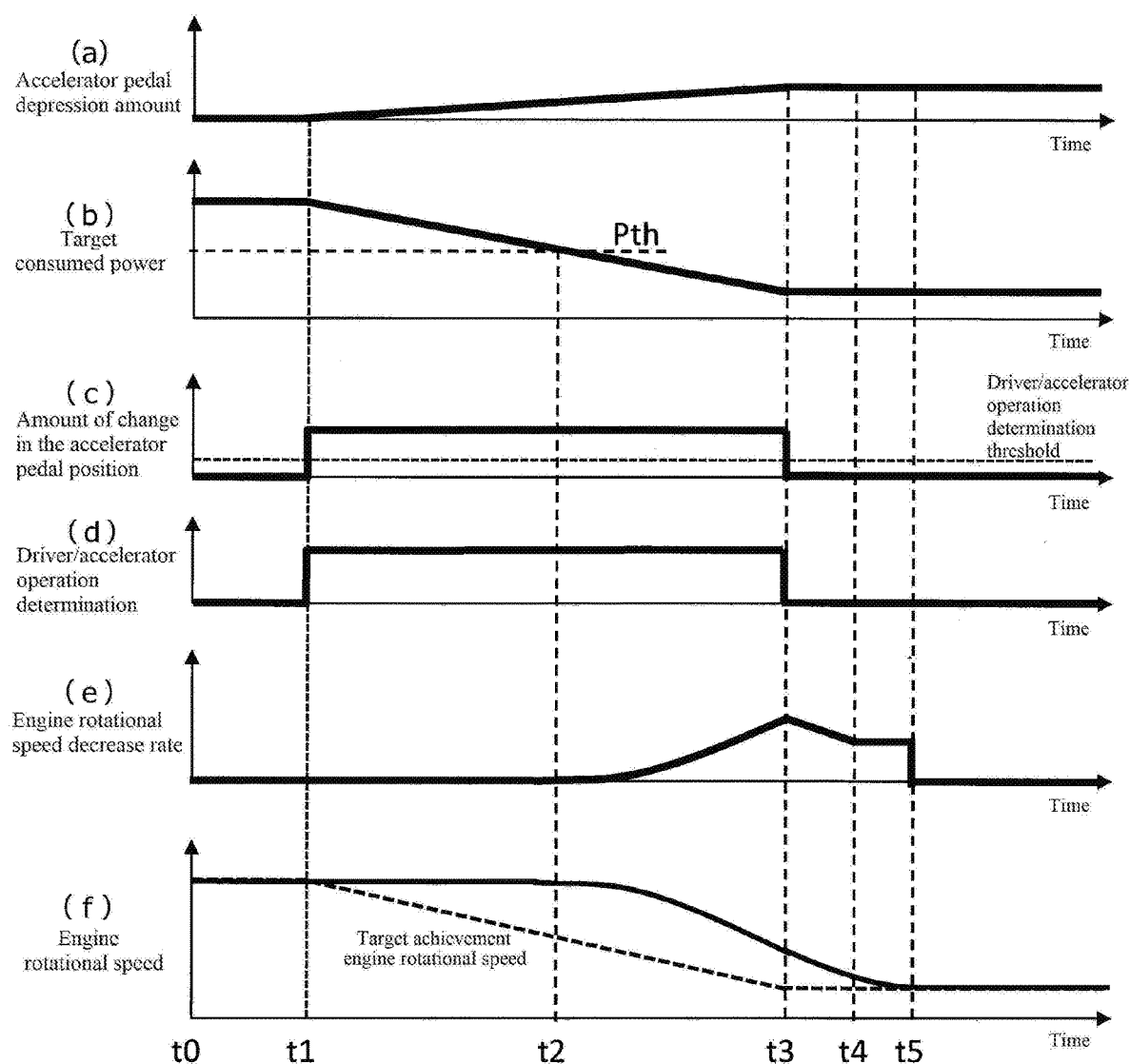
FIG. 17 is a set of time charts illustrating behaviors of respective parameters in a typical scene (during regeneration) for the hybrid vehicle illustrated in FIG. 1.

Behaviors of various parameters when the hybrid vehicle 1 is applied to some typical scenes will then be described. FIG. 13 and FIG. 14 are each a set of time charts when the rotational speed of the engine 11 is increased according to an increase in the required complementary deceleration due to power consumption upon execution of the motoring control. FIG. 15 to FIG. 17 are each a set of time charts when the required complementary deceleration due to power consumption decreases and the engine 11 is driven by the generator 12 upon execution of the motoring control.

FIG. 13 illustrates a state or scene in which the driver is driving the hybrid vehicle. As illustrated in the accelerator pedal depression amount/time graph of FIG. 13(b), the driver depresses the accelerator pedal with a constant amount during time t0 to t1 and releases the accelerator pedal after time t1.

As illustrated in the vehicle speed/tinge graph of FIG. 13(a), the driver's accelerator operation allows the vehicle to travel at a constant speed during time t0 to t1 and then gradually decelerate after time t1. The vehicle speed/time graph of FIG. 13(a) is illustrated with different thicknesses of lines when the vehicle speed is high and low, and the thicknesses of parameter variation lines in each graph of FIGS. 13(d) to 13(f) are illustrated so as to correspond to respective vehicle speeds (high/low). The power/time graph of FIG. 13(c) illustrates the required regenerative power calculated by the target consumed power calculation unit 202 of FIG. 2, the acceptable battery input power calculated by the battery controller 23, and the target consumed power Pc calculated by the target consumed power calculation unit 202 of FIG. 2. The required complementary deceleration due to power consumption/time graph of FIG. 13(d) illustrates the required complementary deceleration due to power consumption DR calculated by the calculation unit 2041 for the required complementary deceleration due to power consumption of FIG. 6. The engine rotational speed/time graph of FIG. 13(e) illustrates the change rate-considered target engine rotational speed (final target engine rotational speed Nc) calculated by the change rate-considered target engine rotational speed calculation unit 204 of FIG. 2. The driving force/time graph of FIG. 13(f) illustrates the driving force of the electric motor 13.

As illustrated in FIG. 13(c), when the driver required driving force (corresponding to the target driving force) is the same, the required regenerative power in the case of a high vehicle speed is higher than that in the case of a low vehicle speed. The target consumed power corresponds to the difference between the required regenerative power and the acceptable battery input power. When the acceptable input power to the battery is the same, the target rotational speed in the case of a high vehicle speed is higher than that in the case of a low vehicle speed.

As illustrated in FIG. 13(d), the required complementary deceleration due to power consumption in the case of a high vehicle speed is the same as that in the case of a low vehicle speed. That is, when the vehicle speed is different and the required complementary deceleration due to power consumption is the same, the target consumed power Pc decreases as the vehicle speed decreases. As illustrated in FIG. 13(e), the engine rotational speed rises from time t1, and the initial change rate of the engine rotational speed in the case of a high vehicle speed is the same as that in the case of a low vehicle speed. When the vehicle speed is low, after time t2, the engine rotational speed increases at a lower change rate than that during time t1 to t2. On the other hand, when the vehicle speed is high, the engine rotational speed increases at a high change rate during time t1 to t3 and, after time t3, increases at a lower change rate than that during time t1 to t3. As illustrated in FIG. 13(f), the driving force in the regenerative direction starts to increase from time t1. The driving force in the regenerative direction in the case of a low vehicle speed is the same as that in the case of a high vehicle speed.

As illustrated in FIG. 13, when the required complementary deceleration due to power consumption is the same regardless of the vehicle speed, the braking force being small does not cause an uncomfortable feeling, and the quietness can be enhanced because the engine rotational speed decreases as the vehicle speed decreases.

Moreover, during the rising period (corresponding to time t1 to t2 or time t1 to t3) in which the engine rotational speed rises, the change rate of the engine rotational speed is high, and a transitional deceleration feel can therefore be given to the driver in response to a deceleration request by regeneration from the driver. Furthermore, the engine rotational speed after the elapse of the rising period transitions at a lower change rate than that during the rising period. This can give a continued deceleration feel to the driver.

FIG. 14 illustrates a state or scene in which the driver is driving the hybrid vehicle. As illustrated in the accelerator pedal depression amount/time graph of FIG. 14(b), the driver depresses the accelerator pedal with a constant amount during time t0 to t1 and releases the accelerator pedal after time t1.

As illustrated in the vehicle speed/time graph of FIG. 14(a), the driver's accelerator operation allows the vehicle to travel at a constant speed during time t0 to t1 and then gradually decelerate after time t1. The vehicle speed/time graph of FIG. 14(a) is illustrated with different thicknesses of lines when the vehicle speed is high and low, and the thicknesses of parameter variation lines in each graph of FIGS. 14(d) to (f) are illustrated so as to correspond to respective vehicle speeds (high/low). The parameters illustrated in the graphs of FIGS. 14(a) to 14(f) are the same as those illustrated in the graphs of FIGS. 13(a) to 13(f).

As illustrated in FIG. 14(c), the required regenerative power in the case of a high vehicle speed is the same as that in the case of a low vehicle speed, and the target consumed power is also the same. As illustrated in FIG. 14(d), the required complementary deceleration due to power consumption in the case of a high vehicle speed is lower than that in the case of a low vehicle speed.

As illustrated in FIG. 14(e), the target achievement engine rotational speed in the case of a high vehicle speed is the same as that in the case of a low vehicle speed. The engine rotational speed rises from time t1. After time t2, the engine rotational speed when the vehicle speed is low increases at a lower change rate than that during time t1 to t2. On the other hand, when the vehicle speed is high, the engine rotational speed increases at a high change rate during time t1 to t3 and, after time t3, increases at a lower change rate than that during time t1 to t3. As illustrated in FIG. 14(f), the driving force in the regenerative direction starts to decrease from time t1. Comparing the case of a low vehicle speed with the case of a high vehicle speed, the driving force in the regenerative direction in the case of a low vehicle speed is larger than that in the case of a high vehicle speed. That is, when the vehicle speed is different and the required regenerative power is the same, the driving force increases as the vehicle speed decreases.

FIG. 15 illustrates a state or scene in which the driver is driving the hybrid vehicle. As illustrated in the accelerator pedal depression amount/time graph of FIG. 15(b), the driver depresses the accelerator pedal with a constant amount during time t0 to t1 and releases the accelerator pedal after time t1.

The SOC/time graph of FIG. 15(a) is illustrated with different thicknesses of lines when the SOC is high and low, and the thicknesses of parameter variation lines in each graph of FIGS. 15(a) and 15(c) to 15(e) are illustrated so as to correspond to respective SOCs (high/low). The parameters illustrated in the graphs of FIGS. 15(c) to 15(f) are the same as those illustrated in the graphs of FIGS. 13(c) to 13(f).

As illustrated in FIG. 15(c), the acceptable battery input power in the case of a high SOC is lower than that in the case of a low SOC, and the target consumed power in the case of a high SOC is larger than that in the case of a low SOC. As illustrated in FIG. 15(d), when the SOC is high, the power with which the battery 14 can be charged is small; therefore, the consumed power by driving the engine 11 is large, and the required complementary deceleration due to power consumption thus increases. That is, the required complementary deceleration due to power consumption in the case of a high SOC is larger than that in the case of a low SOC.

As illustrated in FIG. 15(e), the engine rotational speed rises from t1 and increases at a high change rate and, after time t2, increases at a low change rate. During time t1 to t2, the change rate of the engine rotational speed increases as the SOC increases.

During a period from the time point at which the engine rotational speed rises to the time point at which the engine rotational speed reaches the target achievement engine rotational speed, the change rate of the engine rotational speed during time t1 to t2 (corresponding to the basic target engine rotational speed increase rate) is higher than that during time t2 to t3 (corresponding to the engine rotational speed increase rate for rendering engine sound rise or fall feeling).

FIG. 16 illustrates a state or scene in which the driver is driving the hybrid vehicle. As illustrated in the accelerator pedal depression amount/time graph of FIG. 16(a), the driver does not depress the accelerator pedal during time t0 to t1, then gradually depresses the accelerator pedal after time t1, and further depresses the accelerator pedal after time t5.

According to the driver's accelerator operation, as illustrated in the accelerator pedal depression amount/time graph of FIG. 16(a) and the amount of change in the accelerator pedal position/time graph of FIG. 16(c), the accelerator pedal depression amount is zero during time t0 to t1, the amount of change in the accelerator pedal position is large during time 1 to t5 so that the accelerator pedal depression amount increases at a predetermined increase rate, and the amount of change in the accelerator pedal position is larger after time t5 so that the accelerator pedal depression amount increases at a higher increase rate.

The target consumed power/time graph of FIG. 16(b) illustrates the target consumed power Pc calculated by the target consumed power calculation unit 202 of FIG. 2. The engine rotational speed/time graph of FIG. 16(f) illustrates the change rate-considered target engine rotational speed (final target engine rotational speed Nc) calculated by the change rate-considered target engine rotational speed calculation unit 204 of FIG. 2.

As illustrated in FIG. 16(c), when the amount of change in the accelerator pedal position becomes larger than the driver/accelerator operation determination threshold at time t1, the flag indicating a result of determining the driver's accelerator operation is made to be the set state in the processes illustrated in FIG. 9. At time t1, the target consumed power in the case of a high vehicle speed is higher than a target consumed power threshold. Pth. The target consumed power threshold Pth corresponds to the target consumed power at the folding point of the graph in the fourth map of the control blocks of FIG. 9. When the target consumed power is higher than the target consumed power threshold Pth, the engine rotational speed decrease rate is a constant value (zero) in the processes illustrated in FIG. 9. Accordingly, as illustrated in FIG. 16(e), when the vehicle speed is low, the engine rotational speed decrease rate is zero during time t1 to t2. When the vehicle speed is high, the engine rotational speed decrease rate is zero during time t1 to t3.

At time t2, the target consumed power in the case of a low vehicle speed becomes lower than the target consumed power threshold Pth, and the engine rotational speed decrease rate is therefore larger than the constant value (zero) in the processes illustrated in FIG. 9, As illustrated in FIG. 16(e), the engine rotational speed decrease rate starts to increase. When the vehicle speed is high, the target consumed power Pc is larger than that when the vehicle speed is low; therefore, the timing at which the target consumed power becomes lower than the target consumed power threshold Pth is later than the timing when the vehicle speed is low. At time t3, the target consumed power becomes lower than the target consumed power threshold Pth, and the engine rotational speed decrease rate starts to increase. Comparing the case of a high vehicle speed with the case of a low vehicle speed during time t2 to t4, the maximum value of the engine rotational speed decrease rate (achieved decrease rate) in the case of a high vehicle speed is larger than that in the case of a low vehicle speed.

As illustrated in FIG. 16(b), the target consumed power becomes zero at time t4. As illustrated in FIG. 16(e), the engine rotational speed also becomes zero at time t4. When the vehicle speed is high, the engine rotational speed is decreased from a high state to zero during time t3 to t4. When the vehicle speed is low, the engine rotational speed is decreased from a high state to zero during time t2 to t4. That is, in the case of a low vehicle speed, the time until the engine rotational speed becomes a low state from a high state is longer than that in the case of a high vehicle speed.

In the present embodiment, the timing of releasing the restriction on the change in the engine rotational speed is set in accordance with the target consumed power, but the accelerator pedal depression amount may be used as substitute for the target consumed power. In the processes illustrated in FIG. 4, the target consumed power Pc is determined with the vehicle speed, and when the acceptable battery input power is fixed, the target consumed power Pc increases as the vehicle speed increases. As illustrated in FIG. 16(a), therefore, the target consumed power threshold Pth can be substituted with the accelerator pedal depression amount corresponding to the vehicle speed. When the vehicle speed is high, the target consumed power threshold Pth is substituted with an accelerator pedal depression amount threshold $A_{thH}$, while when the vehicle speed is low, the target consumed power threshold Pth is substituted with an accelerator pedal depression amount threshold $A_{thL}$.

In the case of a low vehicle speed in the travel scene illustrated in FIG. 16, when the accelerator pedal depression amount becomes the accelerator pedal depression amount threshold $A_{thL}$ or more, the restriction on the change in the engine rotational speed is released, and the decrease rate of the engine rotational speed increases. In the case of a high vehicle speed, when the accelerator pedal depression amount becomes the accelerator pedal depression amount threshold $A_{thH}$ or more, the restriction on the change in the engine rotational speed is released, and the decrease rate of the engine rotational speed increases. The accelerator pedal depression amount threshold ($A_{thL}$, $A_{thH}$) for releasing the restriction on the change in the engine rotational speed is a higher value as the decrease rate of the engine rotational speed increases or as the vehicle speed increases. Through this operation, the restriction on the change in the engine rotational speed can be released while keeping the quietness because the engine sound is small when the engine rotational speed is low.

FIG. 17 illustrates a state or scene in which the driver is driving the hybrid vehicle. As illustrated in the accelerator pedal depression amount/time graph of FIG. 17(a), the driver does not depress the accelerator pedal during time t0 to t1, then gradually depresses the accelerator pedal after time t1, and operates the accelerator so that the accelerator pedal depression amount is constant after time t3. The parameters illustrated in the graphs of FIGS. 17(a) to 17(f) are the same as those illustrated in the graphs of FIGS. 16(a) to 16(f).

According to the driver's accelerator operation, as illustrated in the accelerator pedal depression amount/time graph of FIG. 17(a) and the amount of change in the accelerator pedal position/time graph of FIG. 17(c), the accelerator pedal depression amount is zero during time t0 to t1, the amount of change in the accelerator pedal position is large during time t1 to t3 so that the accelerator pedal depression amount increases at a predetermined increase rate, and the accelerator pedal depression amount is constant after time t3.

As illustrated in FIG. 17(b), the target consumed power becomes lower than the target consumed power threshold Pth at time t2; therefore, the restriction on the change in the engine rotational speed is released and, as illustrated in FIG. 17(f), the engine rotational speed starts to decrease. During time t2 to t3, the required deceleration for the vehicle decreases as the accelerator pedal depression amount increases. During time t2 to t3, the decrease rate of the engine rotational speed is larger as the required deceleration decreases. During time t2 to t3, the decrease rate of the engine rotational speed is larger as the consumed power by the motoring control (corresponding to the target consumed power Pc) decreases.

As illustrated in FIG. 17(c), the amount of change in the accelerator pedal position becomes lower than the driver/accelerator operation determination threshold, and the flag indicating a result of determining the driver's accelerator operation is therefore made to be the clear state. As illustrated in FIG. 17(b), the target consumed power is constant after time t3. As illustrated in FIG. 17(e), the engine rotational speed decrease rate starts to decrease at time t3, then smoothly decreases during time t3 to t4, and transitions at a constant value during time t4 to t5.

As illustrated in FIG. 17(e), the engine rotational speed decrease rate starts to decrease at time t3 and smoothly decreases during time t3 to t4. The engine rotational speed decrease rate becomes the constant target engine rotational speed decrease rate during non-driver operation at time t4 and transitions as the constant decrease rate during time t4 to t5. As illustrated in FIG. 17(f), the engine rotational speed matches the target achievement engine rotational speed.

As described above, in the present embodiment, when the engine rotational speed is increased due to an increase in the required deceleration upon execution of the motoring control, the engine rotational speed is set such that the change rate of the engine rotational speed increases as the consumed power by the motoring control increases. This allows the power to be consumed sufficiently, and a satisfactory deceleration feel can be obtained for the driver's intention to decelerate. As a result, the uncomfortable feeling given to the driver can be alleviated.

In the present embodiment, when the engine rotational speed is increased due to an increase in the required deceleration upon execution of the motoring control, the engine rotational speed is set such that the change rate of the engine rotational speed increases as the required deceleration increases. This allows the power to be consumed sufficiently, and a satisfactory deceleration feel can be obtained for the driver's intention to decelerate. As a result, the uncomfortable feeling given to the driver can be alleviated.

In the present embodiment, when the engine rotational speed is increased due to an increase in the required deceleration, the engine rotational speed is set such that the change rate of the engine rotational speed increases as the required deceleration due to the motoring control increases. This allows the power to be consumed sufficiently, and a satisfactory deceleration feel can be obtained for the driver's intention to decelerate. As a result, the uncomfortable feeling given to the driver can be alleviated.

In the present embodiment, when the engine rotational speed is increased due to an increase in the required deceleration upon execution of the motoring control, the increase rate of the engine rotational speed is controlled in accordance with an elapsed time from the time point at which an increase in the rotational speed starts. Through this operation, a satisfactory deceleration feel can be obtained for the driver's intention to decelerate, and the change in the engine rotational speed can be reduced as the elapsed time increases from the time point at which the rotational speed starts to increase, that is, as the engine rotational speed approaches the target achievement engine rotational speed. The quietness can thus be enhanced by relaxing the change in the engine sound in association with the change in the engine rotational speed.

In the present embodiment, the target rotational speed of the engine 11 is calculated based on the required deceleration, and when the engine rotational speed is increased due to an increase in the required deceleration upon execution of the motoring control, the engine rotational speed is set such that the increase rate of the engine rotational speed decreases as a difference between the target rotational speed and the rotational speed based on the increase rate decreases. This can achieve an engine sound rise or fall feeling in the deceleration feel due to the engine brake. Moreover, the change in the engine rotational speed can be reduced as the engine rotational speed approaches the target achievement engine rotational speed, and the quietness can thus be enhanced by relaxing the change in the engine sound in association with the change in the engine rotational speed.

In the present embodiment, the target rotational speed of the engine 11 is calculated based on the required deceleration, and when the engine rotational speed is increased due to an increase in the required deceleration upon execution of the motoring control, the engine rotational speed is set such that, as the target rotational speed increases, the change rate of the engine rotational speed increases during a time period from the time point at which an increase in the rotational speed starts. Through this operation, a satisfactory deceleration feel can be obtained for the driver's intention to decelerate.

In the present embodiment, the hybrid vehicle 1 is capable of setting a plurality of travel modes in which profiles of the target driving force that are set with respect to the traveling speed are different. The travel modes include a first mode of generating first driving force in the regenerative direction for a predetermined operation amount of the accelerator and a second mode of generating second driving force in the regenerative direction for the predetermined operation amount of the accelerator. The first driving force is set larger than the second driving force. For example, the user operates a switch for switching the travel mode to switch between the first mode and the second mode. When the driver releases the accelerator pedal during the travel of the vehicle to enter a so-called regenerative mode, the deceleration when selecting the first mode is larger than the deceleration when selecting the second mode. In the present embodiment, when the engine rotational speed is high in a case in which the acceleration request is made in a state of executing the motoring control or in a case in which the required deceleration becomes small, the engine rotational speed is reduced at a high decrease rate in preparation for the next acceleration. When the first travel mode is selected, the decrease rate of the engine rotational speed is higher; therefore, during the next acceleration, the engine rotational speed can be further increased simultaneously with the acceleration, and the change in the engine sound at that time can give an acceleration feel to the driver.

In the present embodiment, in the case in which the first mode is set and the motoring control is executed, when the required deceleration decreases, the driving of the engine 11 by the generator 12 is requested, and the consumed power by the rotation of the engine 11 is less than a predetermined value, the rotational speed of the engine is set so as to decrease. Through this operation, an acceleration feel can be given to the driver during the next acceleration. The selection between the first mode and the second mode may be performed by switching the shift position. For example, when the shift position is set to the brake position in a state in which the normal travel mode is set, the first mode is selected, while when the shift position is set to the drive position in a state in which the normal drive mode is set, the second mode is selected.

DESCRIPTION OF REFERENCE NUMERALS

1 Hybrid vehicle
11 Engine
111 Output shaft
112 Speed-up gear
12 Generator
121 Rotating shalt
13 Electric motor
131 Rotating shaft
132 Speed-down gear
14 Battery
141 First inverter
142 Second inverter
15 Drive wheel
16 Drive axle
17 Differential gear
171 Gear input shaft
20 Vehicle controller
21 Engine controller
22 Generator controller
23 Battery controller
24 Electric motor controller
25 Accelerator sensor
26 Vehicle speed sensor
27 Shift lever switch sensor/travel mode switch sensor

The invention claimed is:

1. A control method for a hybrid vehicle comprising an electric motor that drives the vehicle to travel, a generator that supplies power to the electric motor, and an engine that drives the generator, the control method comprising:
when bringing the electric motor into a regenerative state, operating the generator to drive the engine in a state in which fuel supply to the engine is cut, thereby executing, in accordance with required deceleration, motoring control for consuming output power of the electric motor; and when increasing a rotational speed of the engine due to an increase in the required deceleration upon execution of the motoring control, setting the rotational speed of the engine such that a change rate of the rotational speed of the engine increases as the required deceleration increases, wherein under same consumed power by the motoring control, the change rate of the rotational speed of the engine after releasing accelerator pedal when the vehicle speed is high is lower than that when the vehicle speed is low.

2. The control method for a hybrid vehicle according to claim 1, comprising when increasing the rotational speed of the engine due to the increase in the required deceleration upon execution of the motoring control, setting the rotational speed of the engine such that the change rate of the rotational speed of the engine increases as deceleration due to the motoring control increases, the deceleration due to the motoring control being included in the required deceleration.

3. The control method for a hybrid vehicle according to claim 1, comprising when increasing the rotational speed of the engine due to the increase in the required deceleration upon execution of the motoring control, controlling an increase rate of the rotational speed of the engine in accordance with an elapsed time from a time point at which an increase in the rotational speed starts.

4. The control method for a hybrid vehicle according to claim 3, comprising:

calculating a target rotational speed of the engine on a basis of the required deceleration; and when increasing the rotational speed of the engine due to the increase in the required deceleration upon execution of the motoring control, setting the rotational speed of the engine such that the increase rate of the rotational speed of the engine decreases as a difference between the target rotational speed and the rotational speed based on the increase rate decreases.

5. The control method for a hybrid vehicle according to claim 1, comprising:

calculating a target rotational speed of the engine on a basis of the required deceleration; and when increasing the rotational speed of the engine due to the increase in the required deceleration upon execution of the motoring control, setting the rotational speed of the engine such that, as the target rotational speed increases, the change rate of the rotational speed of the engine increases during a time period from a time point at which an increase in the rotational speed starts.

6. A control apparatus for a hybrid vehicle comprising an electric motor that drives the vehicle to travel, a generator that supplies power to the electric motor, and an engine that drives the generator, the control apparatus being used in the vehicle and comprising a controller configured to:

when bringing the electric motor into a regenerative state, operate the generator to drive the engine in a state in which fuel supply to the engine is cut, thereby executing, in accordance with required deceleration, motoring control for consuming output power of the electric motor; and when increasing a rotational speed of the engine due to an increase in the required deceleration upon execution of the motoring control, set the rotational speed of the engine such that a change rate of the rotational speed of the engine increases as the required deceleration increases, wherein under same consumed power by the motoring control, the change rate of the rotational speed of the engine after releasing accelerator pedal when the vehicle speed is high is lower than that when the vehicle speed is low.

7. A control method for a hybrid vehicle comprising an electric motor that drives the vehicle to travel, a generator that supplies power to the electric motor, and an engine that drives the generator, the control method comprising:

when bringing the electric motor into a regenerative state, operating the generator to drive the engine in a state in which fuel supply to the engine is cut, thereby executing, in accordance with required deceleration, motoring control for consuming output power of the electric motor; and when increasing a rotational speed of the engine due to an increase in the required deceleration upon execution of the motoring control, setting the rotational speed of the engine such that a change rate of the rotational speed of the engine increases as the required deceleration increases, when a consumed power by the motoring control is equal to a predetermined power and the required deceleration is larger than a predetermined required deceleration, setting the rotational speed of the engine such that the change rate of the rotational speed of the engine after releasing accelerator pedal is a first change rate, and when the consumed power by the motoring control is equal to the predetermined power and the required deceleration is lower than or equal to the predetermined required deceleration, setting the rotational speed of the engine such that the change rate of the rotational speed of the engine after releasing accelerator pedal is a second change rate which is smaller than the first change rate.

* * * * *